(12) United States Patent
Hirano et al.

(10) Patent No.: US 10,578,999 B2
(45) Date of Patent: Mar. 3, 2020

(54) IMAGE FORMING APPARATUS AND IMAGE FORMING SYSTEM

(71) Applicant: CANON KABUSHIKI KAISHA, Tokyo (JP)

(72) Inventors: Shigeru Hirano, Tokyo (JP); Shigeru Tanaka, Tokyo (JP); Yasuharu Chiyoda, Nagareyama (JP); Daigo Matsuura, Tokyo (JP); Mitsuru Hasegawa, Tsukubamirai (JP); Yusuke Yamaguchi, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/508,838

(22) Filed: Jul. 11, 2019

(65) Prior Publication Data

US 2020/0033772 A1 Jan. 30, 2020

(30) Foreign Application Priority Data

Jul. 27, 2018 (JP) ................. 2018-141219

(51) Int. Cl.
*G03G 15/00* (2006.01)
*G03G 15/20* (2006.01)
*H04N 1/00* (2006.01)

(52) U.S. Cl.
CPC ..... *G03G 15/2053* (2013.01); *G03G 15/2064* (2013.01); *G03G 15/5016* (2013.01); *H04N 1/00726* (2013.01); *H04N 1/00774* (2013.01); *G03G 2215/00447* (2013.01); *G03G 2215/00514* (2013.01)

(58) Field of Classification Search
CPC .......... G03G 15/2053; G03G 15/2064; G03G 15/5016; G03G 15/5029; G03G 15/502; G03G 2215/00447; G03G 2215/00514; H04N 1/00726; H04N 1/00774
See application file for complete search history.

(56) References Cited

U.S. PATENT DOCUMENTS 9,288,352 B2 * 3/2016 Miyahara ............... B41J 11/008
9,715,354 B2 * 7/2017 Tachibana ............ G03G 15/502

FOREIGN PATENT DOCUMENTS

JP 2007-271681 A 10/2007

* cited by examiner

*Primary Examiner* — Hoang X Ngo
(74) *Attorney, Agent, or Firm* — Canon U.S.A., Inc. IP Division

(57) ABSTRACT

An image forming apparatus includes an image formation unit, an image heating unit, a placement unit, and a control unit. The image heating unit heats an image formed by image formation unit on the recording material that was placed on the placement unit. If an envelope is placed on the placement unit with a flap of the envelope in a direction perpendicular to a conveyance direction of a recording material, the control unit executed control to automatically execute two-sided printing on the envelope such that images formed on a first and a surface of the envelope are heated by the image heating unit. If an envelope is placed on the placement unit with a flap of the envelope in the conveyance direction of the recording material, the control unit executes control to inhibit execution of two-sided printing on the envelope.

18 Claims, 23 Drawing Sheets

FIG.16

| ENVELOPE | MANUAL SHEET FEEDING TRAY | | |
|---|---|---|---|
| | SIZE (mm) | LONGITUDINAL PLACEMENT | LATERAL PLACEMENT |
| LONG N3 | 265 × 120 | ⇐ LATERAL CONVEYANCE | ⇐ LONGITUDINAL CONVEYANCE |
| WESTERN-STYLE LONG Y3 | 235 × 120 | ⇐ LATERAL CONVEYANCE | ⇐ LONGITUDINAL CONVEYANCE |
| RECTANGULAR K2 | 372 × 240 | NO LATERAL CONVEYANCE | ⇐ LONGITUDINAL CONVEYANCE |
| Monarch | 98.4 × 190.5 | ⇐ LATERAL CONVEYANCE | ⇐ LONGITUDINAL CONVEYANCE |
| COM10 | 104.7 × 241.3 | ⇐ LATERAL CONVEYANCE | ⇐ LONGITUDINAL CONVEYANCE |
| DL | 110 × 220 | ⇐ LATERAL CONVEYANCE | ⇐ LONGITUDINAL CONVEYANCE |
| ISO-C5 | 162 × 229 | ⇐ LATERAL CONVEYANCE | ⇐ LONGITUDINAL CONVEYANCE |

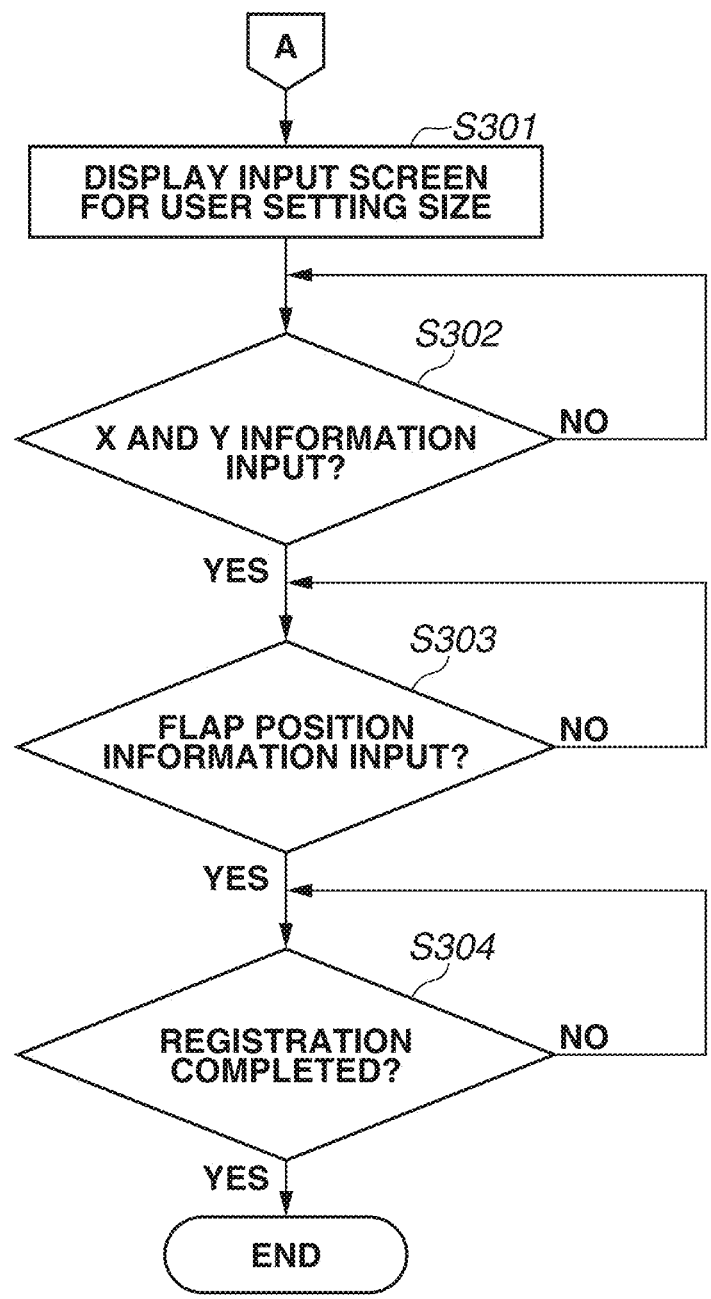

LATERAL PLACEMENT/ LONGITUDINAL CONVEYANCE

LONGITUDINAL PLACEMENT/ LATERAL CONVEYANCE

ADDRESS SURFACE SIDE

NON-ADDRESS SURFACE SIDE

ADDRESS SURFACE SIDE

NON-ADDRESS SURFACE SIDE

IMAGE FORMING APPARATUS AND IMAGE FORMING SYSTEM

BACKGROUND

Field

The present disclosure relates to an electrophotographic method type image forming apparatus which can form an image on a recording material, such as a multifunction peripheral, a copying machine, a printer, and a facsimile machine, and an image forming system.

Description of the Related Art

Conventionally, fixing devices are used to fix toner images formed on recording materials in image forming apparatuses using an electrophotographic method and the like.

Recent diversification of media to be handled, it is required to perform optimum fixing processing on not only flat sheets (plain paper) but also bag-like special paper such as envelopes. Japanese Patent Application Laid-Open No. 2007-271681 discusses an image forming apparatus employing a technique for preventing a wrinkle from being formed on an envelope during fixing by using a nip pressure that is lower than a nip pressure for a normal sheet during fixing on an envelope.

However, on an envelope, a wrinkle easily forms and misalignment of a fold of a flap easily occurs due to conveyance in automatic two-sided printing compared with one-sided printing. Therefore, there is a possibility that a wrinkle is formed on an envelope in the automatic two-sided printing on the envelope depending on a sheet feeding direction.

SUMMARY

The automatic two-sided printing is performed in such a manner that a recording material with a toner image formed and fixed on a first surface thereof is automatically turned over and automatically conveyed again to an image formation unit via a two-sided printing conveyance path in an image forming apparatus, and a toner image is formed and fixed on a second surface.

The present disclosure is directed to reduction of a wrinkle on an envelope in a case where automatic two-sided printing is performed on the envelope.

According to an aspect of the present disclosure, an image forming apparatus includes an image formation unit configured to form an image on a recording material, an image heating unit configured to heat the image formed on the recording material by the image formation unit, a placement unit on which a recording material to be conveyed to the image formation unit is to be placed, and a control unit configured to execute a mode for automatically forming an image on both surfaces of an envelope in such a manner that, after heating an image formed on a first surface of the envelope conveyed from the placement unit to the image formation unit, an image formed on a second surface of the envelope conveyed again to the image formation unit is heated, wherein, in a case where an envelope is placed on the placement unit in a first state in which a flap of the envelope is in a direction perpendicular to a conveyance direction of a recording material, the control unit causes execution of two-sided printing on the envelope in the image forming mode and, in a case where an envelope is placed on the placement unit in a second state in which a flap of the envelope is in the conveyance direction of the recording material, the control unit inhibits execution of two-sided printing on the envelope in the image forming mode.

Further features of the present disclosure will become apparent from the following description of exemplary embodiments with reference to the attached drawings.

BRIEF DESCRIPTION OF THE DRAWINGS

FIG. 1 is a diagram illustrating an example of a display screen in a case where the automatic two-sided printing is selected (a case where the automatic two-sided printing is enabled).

FIG. 16 is a diagram illustrating correspondences between types and sizes of standard-size envelopes and orientations which can be set to a manual sheet feeding tray in a case of one-sided printing.

FIG. 17 is a flowchart illustrating sheet registration in a case where an envelope is set in the sheet feeding unit.

DESCRIPTION OF THE EMBODIMENTS

Various exemplary embodiments according to the present disclosure will be described in detail below with reference to the attached drawings. Components described in the exemplary embodiments are however merely examples and do not intend to restrict the present disclosure to the described exemplary embodiments. In other words, the components described in the following exemplary embodiments can be appropriately modified in their dimensions, materials, shapes, and relative layout considering the configurations and various conditions of an apparatus to which the present disclosure is applied. Unless otherwise specified, they are not to be construed as intended to restrict the scope of the present disclosure.

According to the following exemplary embodiments, an image forming apparatus 100 is described using a copying machine including a printer unit 304 and a document reading unit 303 as an example. According to the following exemplary embodiments, a laser beam printer using an electrophotographic method which includes a full-color image formation unit using an intermediate transfer method is described as an example of the printer unit 304, but the printer unit 304 is not limited to this one. For example, an apparatus using direct transfer method may be adopted which directly transfers an image from photosensitive drums a to d to a recording material without using an intermediate transfer belt 2 described below. Further, for example, an apparatus which forms a single color toner image (for example, a monochromatic apparatus) may be adopted. The image forming apparatus 100 may be a copying machine, a printer, a facsimile machine, and a multifunction peripheral having a plurality of functions of these machines.

In the following descriptions, a recording material P is a recording medium on which a toner image can be formed by the image forming apparatus 100. Examples of the recording material P includes plain paper, thin paper, thick paper, high quality paper, coated paper, an envelope, a postcard, a seal, a resin sheet, an overhead projector (OHP) sheet, a print sheet, and a format sheet having a regular size or an irregular size. Handling of the recording material P is described using terms related to paper, such as sheet passing, sheet feed, sheet discharge, a sheet passing portion, and a non-sheet passing portion for convenience sake, but a recording material on which an image can be formed in the image forming apparatus 100 is not limited to paper. The following descriptions are made while focusing on a case in which an envelope is used as the recording material P in some cases, but a recording material on which an image can be formed in the image forming apparatus 100 is not limited to an envelope.

<Names of Envelope Parts>

In the following descriptions, an "envelope" refers to a bag-like recording material. An envelope generally refers to a paper bag for enclosing a letter, a document, and the like, but a material thereof is not limited.

Figure 21A:
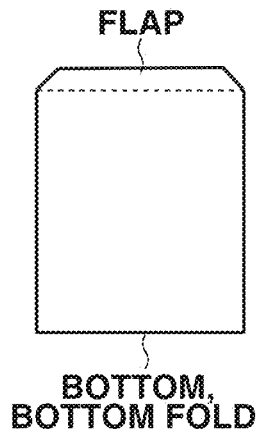
FIGS. 21A to 21D are diagrams each illustrating names of parts of an envelope.
Figure 21B:
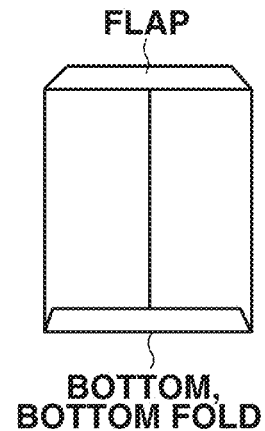
Figure 21C:
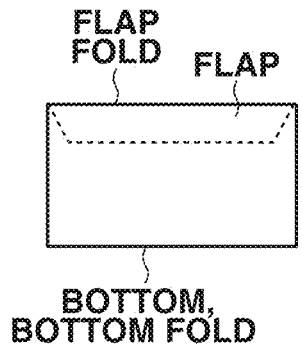
Figure 21D:
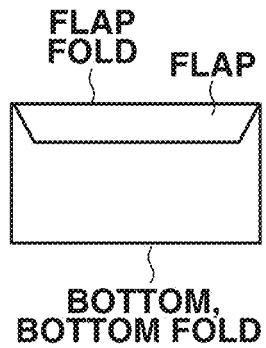

FIGS. 21A to 21D are diagrams each illustrating names of parts of an envelope. FIG. 21A illustrates an address surface side of an envelope in a state in which a flap thereof is opened, and FIG. 21B illustrates a non-address surface side of an envelope in a state in which a flap thereof is opened. FIG. 21C illustrates an address surface side of an envelope in a state in which a flap thereof is closed, and FIG. 21D illustrates a non-address surface side of an envelope in a state in which a flap thereof is closed.

In the descriptions of an envelope, an "address surface" (a front surface) refers to a surface not being covered by the flap when the flap of the envelope is closed. Generally, an address surface refers to a surface on which an address of a destination is written, but use of the envelope is not limited by this name.

Further, in the descriptions of an envelope, a "non-address surface" (a back surface) refers to a surface being covered by the flap when the flap of the envelope is closed. However, as with the address surface, use of the envelope is not limited by this name.

As illustrated in FIGS. 21A to 21D, an envelope is folded in a bag shape so that a bottom part is formed on an opposite of a sealing side of the envelope. In the descriptions of an envelope, a fold portion forming a bottom of an envelope is referred to as a "fold forming a bottom" and a "bottom fold". In an envelope, a bottom is a portion on an opposite side of a flap (or a fold of the flap) of the envelope when an address surface (or a non-address surface) of the envelope is viewed.

<Automatic Two-Sided Printing and Setting Direction of Envelope>

Figure 22:
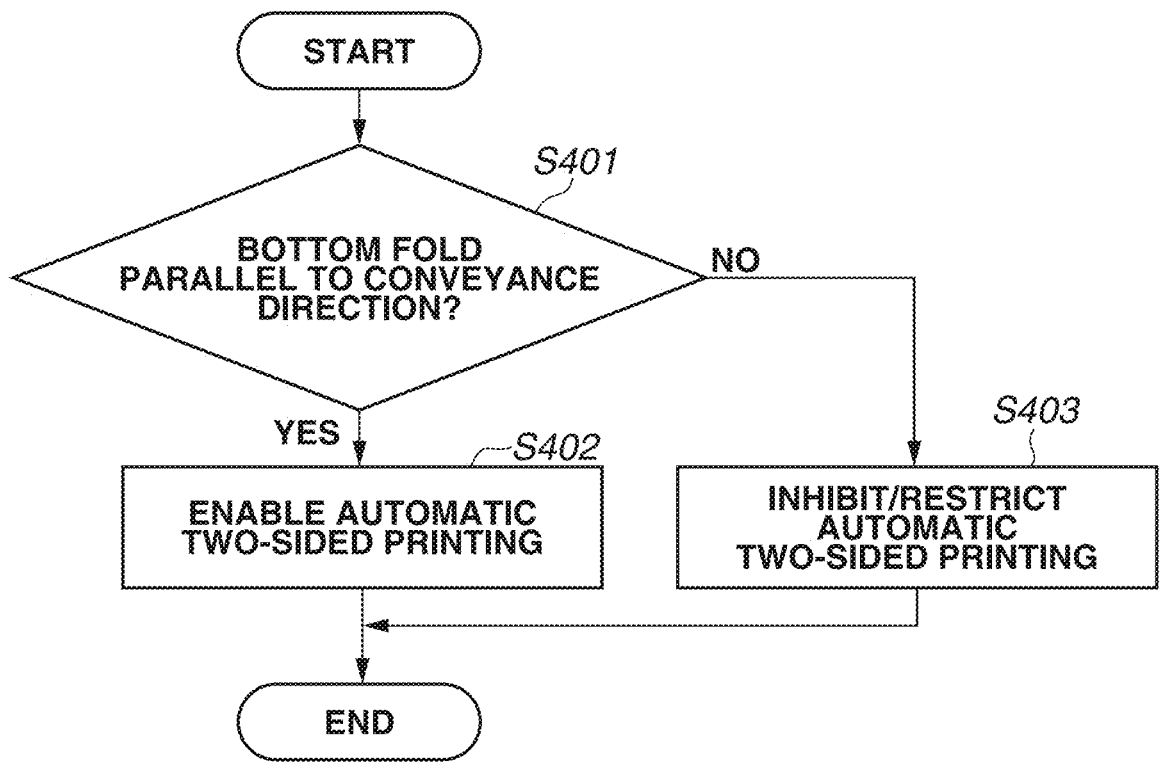
FIG. 22 is a flowchart illustrating an overview of control of the image forming apparatus.

FIG. 22 is a flowchart illustrating an entire concept of two-sided printing on an envelope according to the present exemplary embodiment. The details will be described below according to the exemplary embodiments. According to the present exemplary embodiment, in step S402, the image forming apparatus 100 enables execution of automatic two-sided printing with respect to an envelope which is placed (set) in an orientation in which a bottom fold thereof extends in a conveyance direction of the envelope. Meanwhile, in step S403, the image forming apparatus 100 inhibits/restricts execution of the automatic two-sided printing with respect to an envelope which is placed (set) in an orientation in which a bottom fold thereof extends in a direction perpendicular to the conveyance direction (hereinbelow, referred to as a width direction) of the envelope.

Figure 10A:
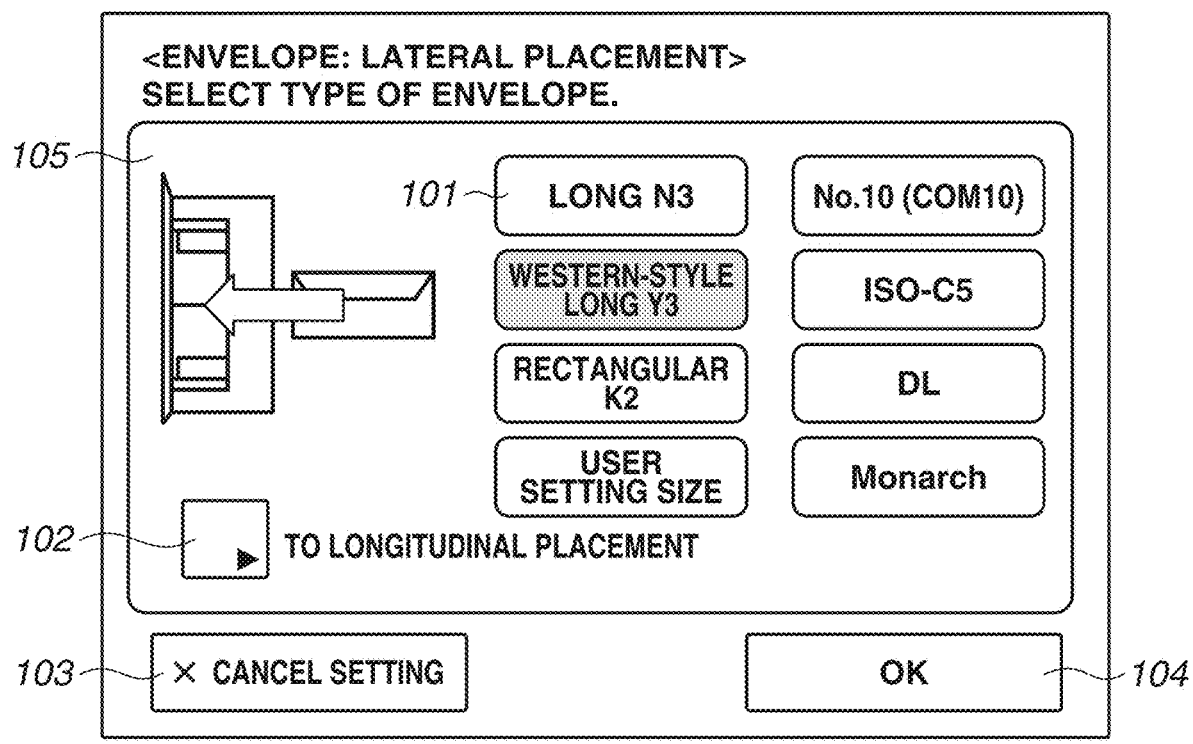
FIG. 10A is a diagram illustrating an example of a display screen in a case where Western-style Long Y3 (lateral placement) is selected.
Figure 20A:
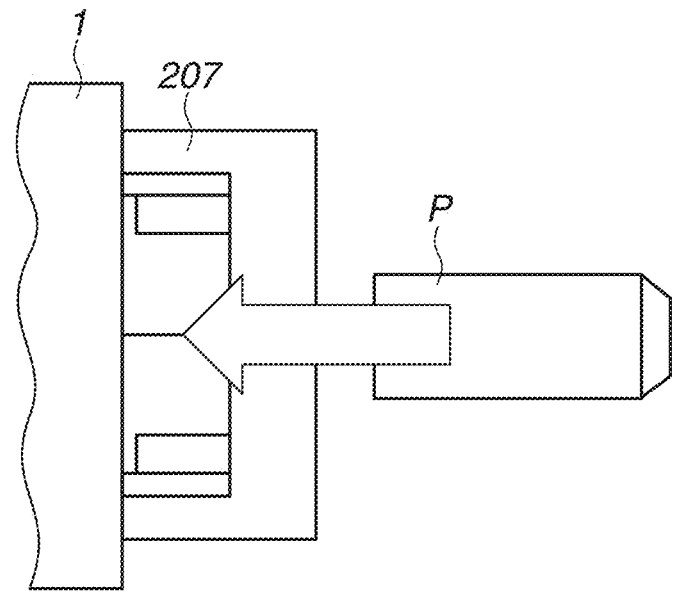
FIG. 20A is a diagram illustrating lateral placement.
Figure 20B:
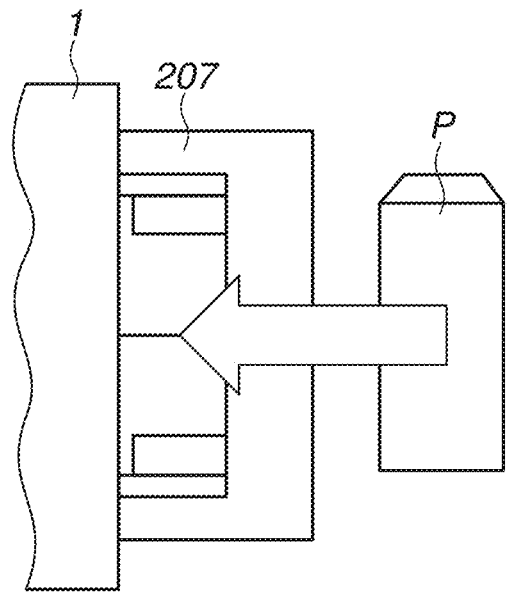
FIG. 20B is a diagram illustrating longitudinal placement.

An orientation in which a bottom fold extends in a conveyance direction of an envelope is, for example, an orientation as illustrated in FIG. 20B and FIG. 10A. In other words, it is the orientation in which the bottom fold of the envelope is substantially parallel to the conveyance direction. In a case of an envelope in a state in which a flap thereof is closed as illustrated in FIGS. 21C and 21D, it can be described as an orientation in which a fold of the flap extends in the conveyance direction of the envelope (FIG. 10A).

Figure 10B:
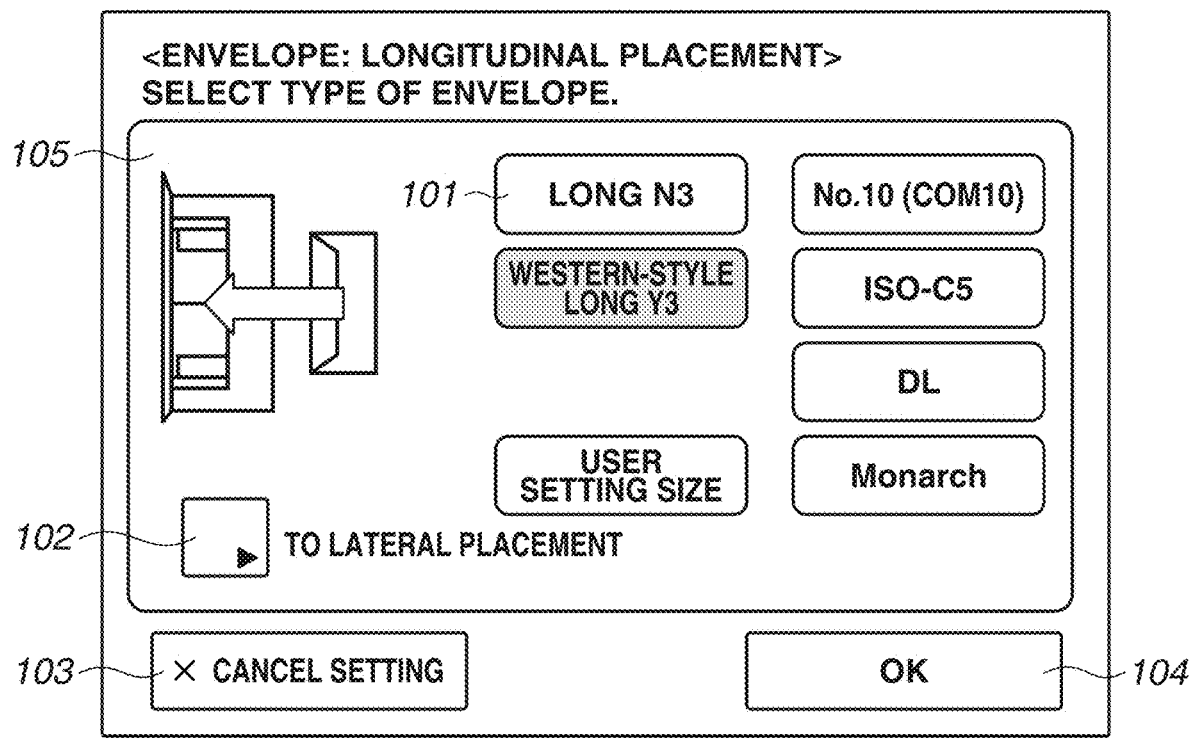
FIG. 10B is a diagram illustrating an example of a display screen in a case where Western-style Long Y3 (longitudinal placement) is selected.

An orientation in which a bottom fold extends in a width direction of an envelope is, for example, an orientation as illustrated in FIG. 20A and FIG. 10B. In other words, the bottom fold of the envelope is substantially perpendicular to the conveyance direction. In the case of the envelope in the state in which the flap thereof is closed as illustrated in FIGS. 21C and 21D, it can be described as an orientation in which the fold of the flap extends in the width direction (FIG. 10B).

Regarding a standard-size envelope, names such as "Long N3", "Rectangular K2", and "Western-style Long Y3" are names of sizes and do not limit an open/close state of a flap.

However, "Long N3" and "Rectangular K2" envelopes are often sold in a state in which flaps thereof are opened, so that FIGS. 13A, 13B, 14, and 16 illustrate these envelopes in schematic diagrams in a state in which flaps thereof are opened. "Long N3" and "Rectangular K2" envelopes are described as representative examples of envelopes. Similarly, FIGS. 10A, 10B, and 16 illustrate a "Western-style Long Y3" envelope in a schematic diagram in a state in which a flap thereof is closed.

<Setting Direction of Envelope (Lateral Placement and Longitudinal Placement)>

In the following descriptions, terms "lateral placement" and "longitudinal placement" are used for referring a setting direction of an envelope in a placement unit in some cases.

FIG. 20A is a diagram illustrating lateral placement and FIG. 20B is a diagram illustrating longitudinal placement using a case in which a manual sheet feeding tray 207 is used as an example of the placement unit for an envelope. Arrows in FIGS. 20A and 20B indicate a conveyance direction of an envelope.

In the following descriptions, conveying an envelope in an orientation in which a long side of the envelope coincides with the conveyance direction as illustrated in FIG. 20A is referred to as "longitudinal conveyance". In a case where the image forming apparatus 100 according to the present exemplary embodiment is viewed from a front side thereof, the manual sheet feeding tray 207 is disposed on a side of the image forming apparatus 100, and in a case where an envelope P placed on the manual sheet feeding tray 207 is viewed from above, the envelope P is placed in an orientation illustrated in FIG. 20A in "longitudinal conveyance". In the following descriptions, placing an envelope on the placement unit in an orientation in which a long side of the envelope is substantially parallel to the conveyance direction is referred to as "lateral placement".

Further, in the following descriptions, conveying an envelope in an orientation in which a short side of the envelope coincides with the conveyance direction as illustrated in FIG. 20B is referred to as "lateral conveyance". In a case where the envelope P placed on the manual sheet feeding tray 207 on the side of the image forming apparatus 100 is viewed from above, the envelope P is placed in an orientation illustrated in FIG. 20B in "lateral conveyance". In the following descriptions, placing an envelope on the placement unit in an orientation in which a short side of the envelope is substantially parallel to the conveyance direction is referred to as "longitudinal placement".

<Entire Configuration of Image Forming Apparatus>

Figure 1:
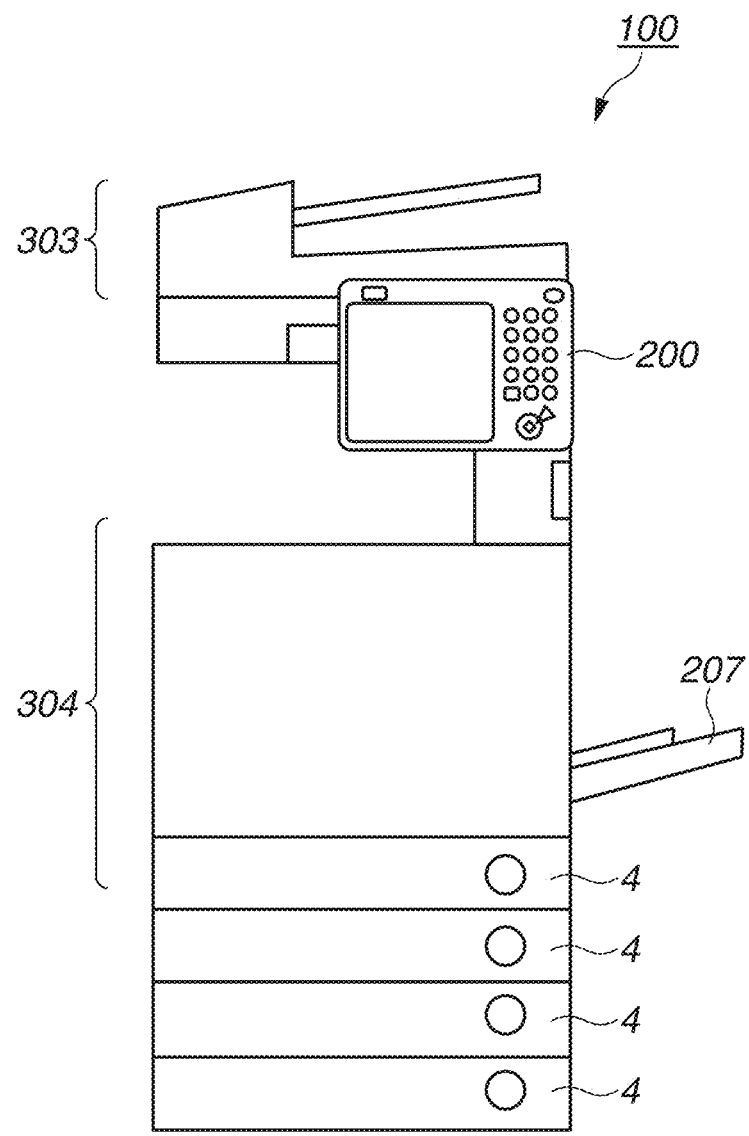
FIG. 1 is a diagram illustrating an example of an external view of an image forming apparatus.
Figure 2:
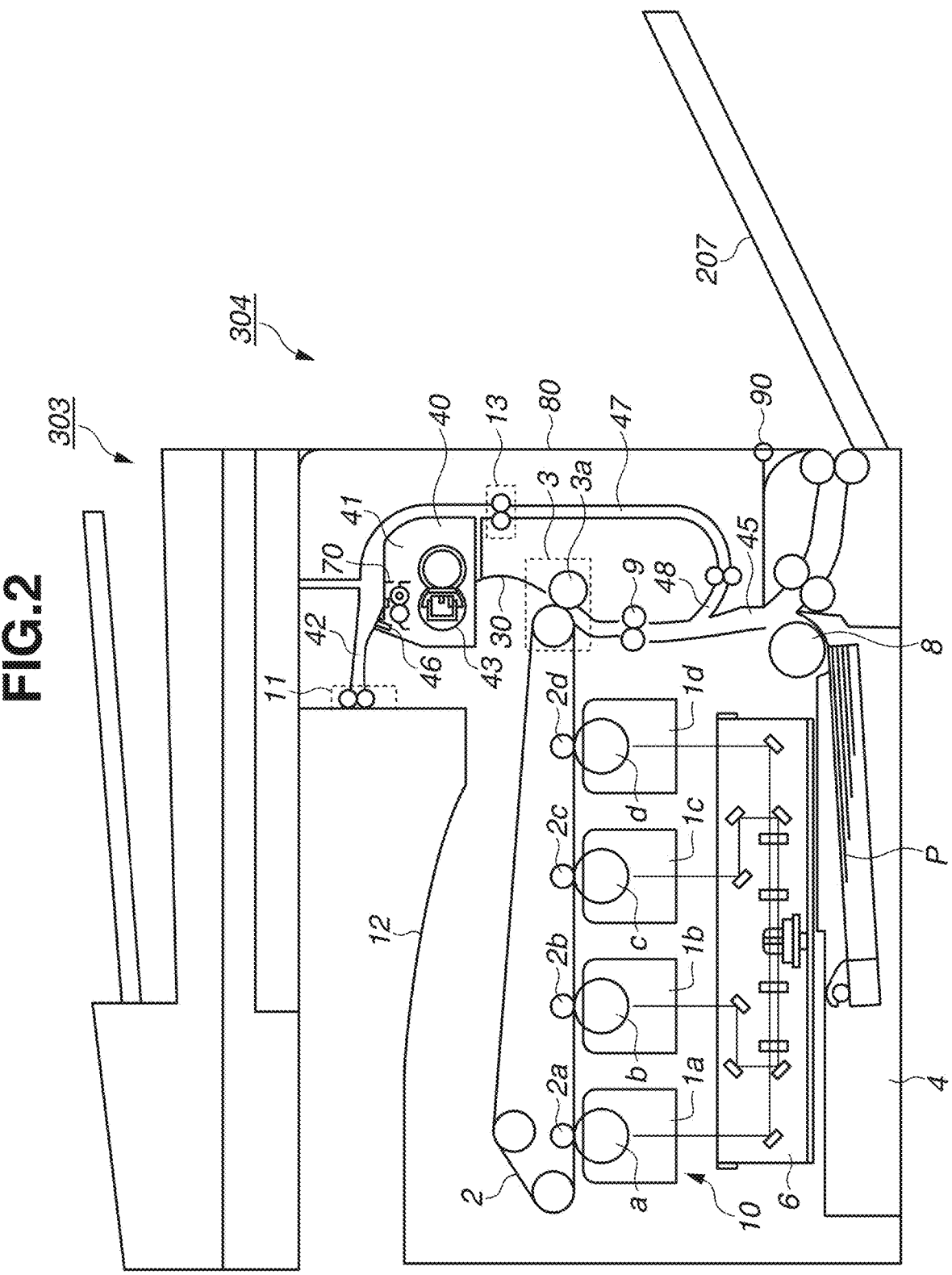
FIG. 2 is a diagram illustrating an example of a schematic cross-sectional view of the image forming apparatus.

FIG. 1 is an external view illustrating the image forming apparatus 100. FIG. 2 is a cross-sectional view of a tandem type full color printer as an example of the printer unit 304 in the image forming apparatus 100.

The printer unit 304 illustrated in FIG. 2 includes an image formation unit 10 which forms a toner image on a recording material P. The image formation unit 10 includes a laser scanner (an exposure unit) 6, primary transfer rollers (primary transfer units) 2a to 2d, the intermediate transfer belt (an intermediate transfer member) 2, and a secondary transfer unit 3 in addition to image forming units 1a to 1d. The image forming units 1a to 1d respectively form toner images in colors of yellow (Y), magenta (M), cyan (C), and black (Bk) on the intermediate transfer belt. The image forming units 1a to 1d includes the photosensitive drums (photosensitive members) a to d, charging devices (charging units), and developing devices (developing units). Configurations of the image forming units are similar to each other except for a point that color of toner stored in the respective developing devices is different. The configuration of the image forming unit is described using the image forming unit 1a as a representative example.

The photosensitive drum a is charged in advance by the charging device. Subsequently, the laser scanner 6 forms a latent image on the photosensitive drum a. The latent image formed on the photosensitive drum a is developed to a toner image by the developing device.

The toner images formed on the photosensitive drums a to d are successively transferred to the intermediate transfer belt 2 by the primary transfer rollers 2a to 2d.

The recording material P to be used for image forming is placed on a sheet feeding cassette (a placement unit) 4 arranged in a lower part of the image forming apparatus 100 or the manual sheet feeding tray (a placement unit) 207.

The manual sheet feeding tray 207 is a sheet feeding tray which is installed separately from the sheet feeding cassette 4 and feeds the recording material P to the image forming apparatus 100. The manual sheet feeding tray 207 is often used especially in a case where an envelope, special paper such as an OHP sheet, or a material which is less frequently used is used as the recording material P.

On the other hand, the recording material P is fed from the sheet feeding cassette 4 one by one and conveyed to a registration roller pair 9 through a conveyance path 45. The registration roller pair 9 receives the recording material P once and corrects skew if the recording material P is skewed. Subsequently, the registration roller pair 9 feeds the recording material P into a gap between the intermediate transfer belt 2 and a secondary transfer roller 3a by synchronizing with the toner image on the intermediate transfer belt 2. The color toner image on the intermediate transfer belt 2 is transferred to the recording material P by the secondary transfer roller 3a. In other words, the toner image is formed on the recording material P by the image formation unit 10, the intermediate transfer belt 2, and the secondary transfer roller 3a.

Subsequently, the recording material P on which the toner image is formed is conveyed to a fixing device (a fixing unit) 40 through a conveyance path 30. The fixing device 40 includes a fixing belt (an endless belt, a rotation member) 43 and a pressure roller (a rotation member) 41, and the fixing belt 43 and the pressure roller 41 form a fixing nip portion (a nip portion) N in cooperation with each other. The recording material P on which the toner image is formed is conveyed to the nip portion N and heated and pressed at the nip portion N, so that the toner image is fixed to the recording material P.

The fixing device 40 includes a heater as a heating source for heating the fixing belt 43. The heater includes, for example, a ceramic heater and a halogen heater. An electromagnetic induction heating type induction heating (IH) heater may be adopted to heat the fixing belt 43. At least one of the fixing belt 43 and the pressure roller 41 is pressed toward the other by a pressurizing unit, and thus the fixing nip portion N is formed. The fixing device 40 includes a motor (a drive source) for rotating the pressure roller 41. The fixing belt 43 rotates by rotation of the pressure roller 41. The pressure roller 41 is rotated by the motor, and the fixing device 40 conveys the recording material P introduced into the fixing nip portion N to a downstream side of the fixing nip portion N.

In the case of one-sided printing, in other words, in a case where a toner image is formed on only one surface of the recording material P, the recording material P on which the toner image is fixed passes through a conveyance path 42 by switching of a switch flapper 46 so that the recording material P is discharged to a sheet discharge tray 12 (an outside of the apparatus) by a sheet discharge roller 11.

On the other hand, in the case of the two-sided printing, in other words, in a case where toner images are formed on both surfaces of the recording material P, the recording material P of which a toner image on one surface (a first surface) is fixed by the fixing device 40 is conveyed to a two-sided printing conveyance path 47. Specifically, when a trailing edge of the recording material P reaches a reverse point by being conveyed by the sheet discharge roller 11, the recording material P is subjected to switch-back conveyance by reverse rotation of the sheet discharge roller 11 and is conveyed through the two-sided printing conveyance path 47. A part including the switch flapper 46 and the sheet discharge roller 11 which form a part for a switch-back operation is an example of a reversing unit which reverses front and back of the recording material P. The recording material P which is turned over is introduced into the secondary transfer unit 3 again in an orientation in which a second surface of the recording material P is in contact with the intermediate transfer belt 2. Then, a toner image is transferred to the second surface (a back surface) of the recording material P by the secondary transfer roller 3a. Subsequently, the toner image transferred to the recording material P is heated and pressed again by the fixing device 40 and fixed to the recording material P. Subsequently, the recording material P with the toner image formed on a back surface side thereof is discharged on the sheet discharge tray (the outside of the apparatus) 12 via the sheet discharge roller 11 by switching of the switch flapper 46.

In a case where an envelope is used as the recording material P, a toner image is formed on the envelope.

Figure 3:
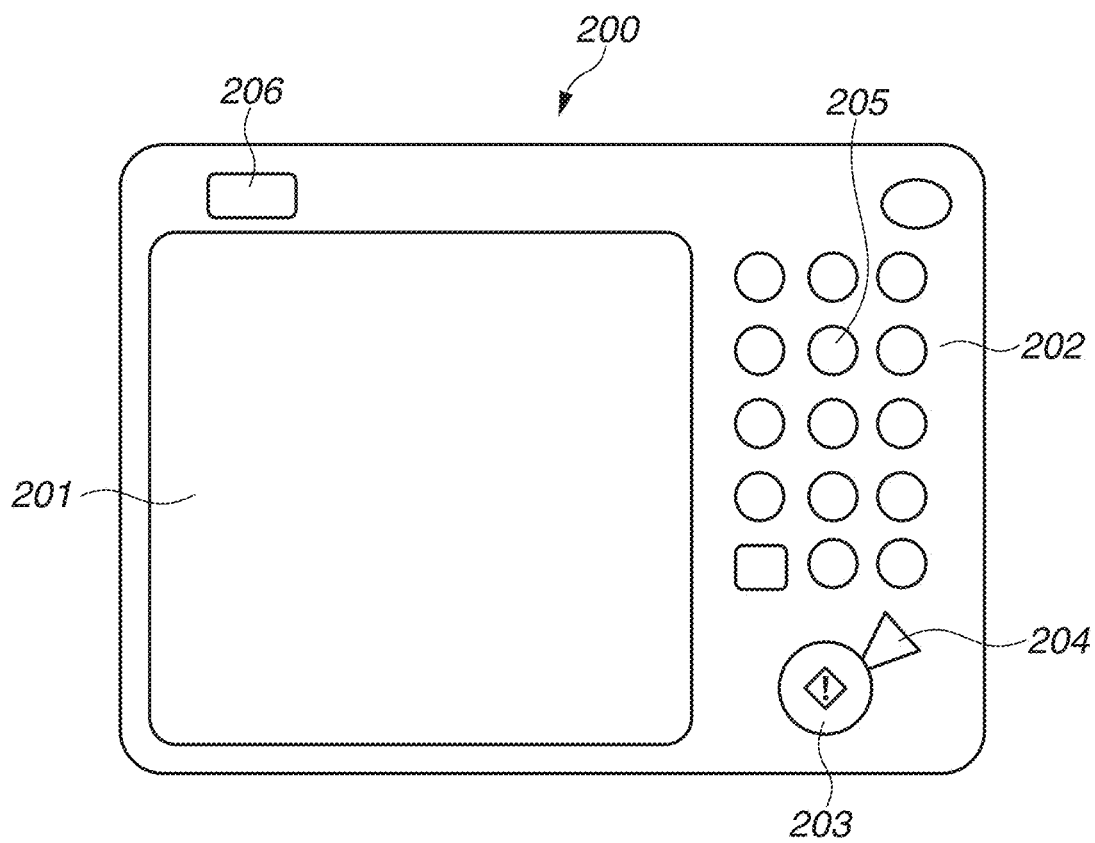
FIG. 3 is a diagram illustrating an example of an operation unit.

An operation unit 200 is used by an operator (an operator or a user who operates the image forming apparatus 100) to input an instruction of an operation with respect to the image forming apparatus 100 and to input information to the image forming apparatus 100. FIG. 3 is an enlarged view of an example of the operation unit 200.

An operation display unit 201 which is provided with a touch panel applied on a liquid crystal displays an operation screen and a soft key and, in a case where a displayed key is pressed, transmits position information about the pressed key to a controller. The controller of the operation unit 200 may be formed integrally with a central processing unit (CPU) 300, or a controller separate from the CPU 300 may control the operation unit 200 according to a sequence instructed from the CPU 300.

A keyboard (hard key) 202 includes a start key 203, a stop key 204, and numeric keypads 205. The start key 203 is used for instructing a start of a reading operation of an original image and the like. The stop key 204 functions to stop an operation in progress. The numeric keypads 205 include a button group of numbers and letters and are used to set the number of copies, to instruct switching of screens on the operation display unit 201 and the like. A user mode key 206 is pressed in a case where setting of the image forming apparatus 100 is performed, and when the user mode key 206 is pressed, a user mode screen is displayed. The user mode screen includes a sheet setting item.

According to the present exemplary embodiment, the operation unit 200 includes the keyboard 202. Alternatively, the operation unit 200 may display an operation key on the operation display unit 201 and may not include the hard key.

Figure 4:
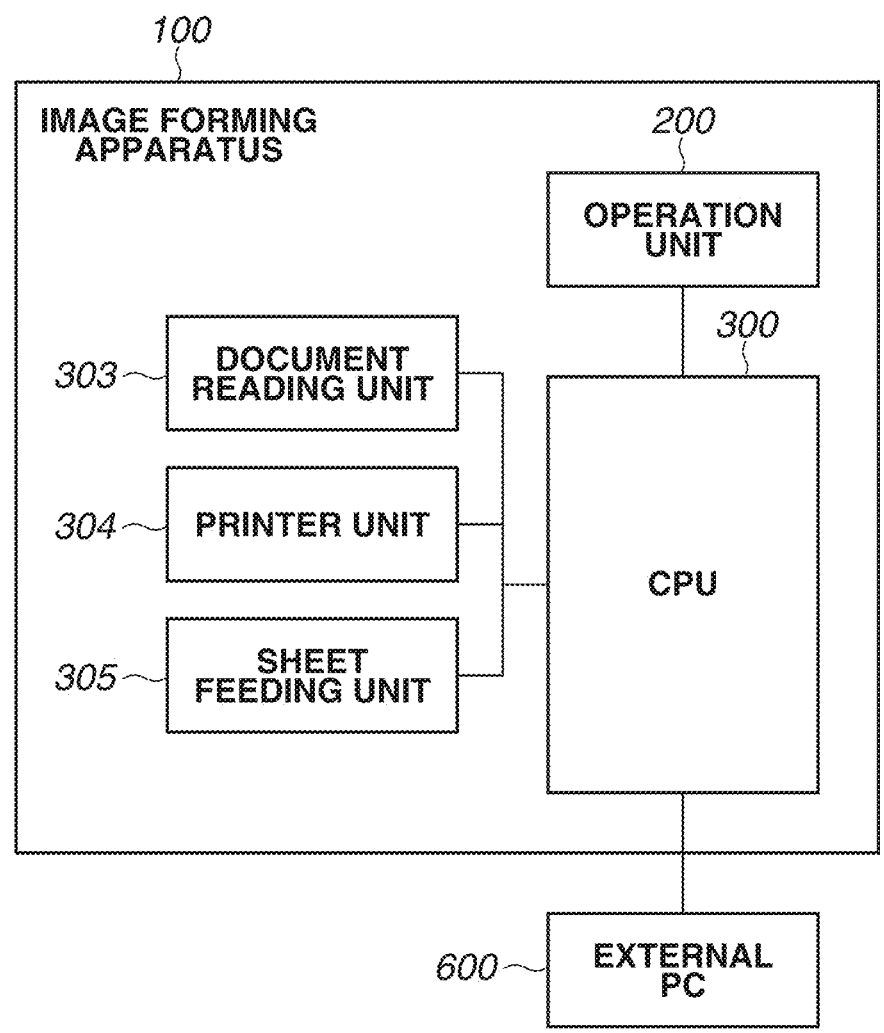
FIG. 4 is a diagram illustrating an example of a block diagram of a control system.

FIG. 4 is a block diagram illustrating a control system according to the present exemplary embodiment. The CPU 300 functioning as a control unit is electrically connected to the operation unit 200, the document reading unit 303, the printer unit 304, a sheet feeding unit 305, and the like and controls operations of these mechanisms. The sheet feeding unit 305 includes, for example, the manual sheet feeding tray 207, the sheet feeding cassette 4, and a sheet feeding roller for feeding a recording material placed on the manual sheet feeding tray 207 and the sheet feeding cassette 4. The CPU 300 exchanges electrical information with these mechanisms and comprehensively controls an image forming operation by the image forming apparatus 100 according to a predetermined control program and a reference table stored in a memory which is included in the image forming apparatus 100 or is built in the CPU 300. Processing in various flowcharts described below is executed according to a program stored in the memory in advance by the CPU 300. The CPU 300 includes a memory for storing input information, determines an image forming condition based on the stored information, and can perform image forming under a predetermined condition in a case where an image is formed. The CPU 300 can execute a copy operation based on original image data read by the document reading unit 303 and an image forming condition input from the operation unit 200. Further, the CPU 300 can connect to an external personal computer (PC) 600 via a network and execute a print operation based on image data and an image forming condition transmitted from the external PC 600.

<Automatic Two-Sided Printing and One-Sided Printing on Envelope>

As described above with reference to FIG. 22, according to the present exemplary embodiment, the image forming apparatus 100 enables execution of the automatic two-sided printing on an envelope which is placed in an orientation in which a bottom fold thereof extends in the conveyance direction of the envelope. Meanwhile, the image forming apparatus 100 inhibits execution of the automatic two-sided printing on an envelope which is placed in an orientation in which the bottom fold thereof extends in the width direction. One-sided printing is executed on the envelope to which execution of the automatic two-sided printing is inhibited.

A case in which the automatic two-sided printing is inhibited and a reason thereof are described below.

First, an envelope in a state in which a flap thereof is opened is described.

Conventionally, in a case where the one-sided printing is performed on an envelope in a state in which a flap thereof is opened, it is recommended to convey the envelope in the following orientation to prevent a wrinkle from being formed on a non-flap side of the envelope, i.e., it is recommended to convey an envelope so that the envelope is introduced into the nip portion N in an orientation in which a bottom side (a non-flap side) is at a leading edge as illustrated in FIG. 20A. Therefore, in a case where the one-sided printing is performed on an envelope in a state in which a flap thereof is opened, it is recommended to set the envelope in the placement unit in an orientation in which the envelope is introduced into the nip portion N from the bottom side.

An envelope in a state in which a flap thereof is opened is, for example, the one illustrated in FIGS. 21A and 21B, and an envelope having a flap on a short side like a Rectangular K2 envelope is often sold in a state in which a flap thereof is opened.

In a case of an envelope in a state in which a flap thereof is opened, if the envelope which is set in an orientation as illustrated in FIG. 20A is conveyed and subjected to the automatic two-sided printing, there is a possibility that a wrinkle is formed on the envelope while printing is performed on a second surface of the envelope.

Specifically, in a case where an envelope is fed to be introduced into the nip portion N in an orientation in which a bottom side is at a leading edge as illustrated in FIG. 20A, a wrinkle is hardly formed on the envelope while fixing is performed on a first surface of the envelope. However, in a case where the automatic two-sided printing is performed, the envelope with a toner image fixed on the first surface is turned over by the reversing unit in the image forming apparatus 100 and conveyed in a state in which a leading edge of the first surface in the conveyance direction becomes a trailing edge of the second surface in the conveyance direction.

The envelope subjected to the two-sided printing is curved by being pressed and conveyed by the fixing nip portion N when passing through the fixing device 40 in the first time and in a curve from the reversing unit to the two-sided printing conveyance path 47. Due to a curl generated as described above on the envelope, envelope sheets on front and back sides are misaligned with each other or swelled from one side. Particularly, the envelope is conveyed to the fixing nip portion N via the two-sided printing conveyance path 47 in a state in which a portion on an opening (a sealing port) side on which the flap is provided to the envelope has a gap between the sheet on the front side and the sheet on the back side due to the curl in some cases.

Further, the envelope having the toner image formed on the second surface enters the fixing nip portion N in an orientation in which a flap side is the leading edge in the conveyance direction. If the envelope is introduced into the fixing nip portion N from the flap side in a misaligning and swelling state between the sheets of the front and back sides during fixing on the first surface, the misalignment between the sheets of the front and back sides is further worsened and becomes slack by a difference in speed caused on the front and back sides of the envelope during conveyance by the fixing device 40. There is a possibility that the slack between the sheets is accumulated to a part where the envelop sheet is closed in a bag shape of the envelope (the bottom side), and a wrinkle is formed on the envelope in the end.

Therefore, according to the present exemplary embodiment, in a case where an envelope is placed on the manual sheet feeding tray 207 to be introduced into the fixing nip portion N in an orientation in which a bottom fold thereof extends in the width direction, execution of the automatic two-sided printing using the envelope is inhibited.

Further, in a case where an envelope is placed on the manual sheet feeding tray 207 in an orientation in which a bottom fold thereof extends in the conveyance direction, execution of the automatic two-sided printing using the envelope is enabled. More specifically, in a case where the automatic two-sided printing is performed on an envelope in a state in which a flap thereof is opened, the envelope is conveyed in the orientation in which the bottom fold extends in the conveyance direction. If the envelope is conveyed in that orientation, the envelope is introduced into the fixing nip portion N from a fold perpendicular to the bottom fold at the time of fixing on the first surface and also at the time of fixing on the second surface. In other words, the envelope is not introduced into the fixing nip portion N from an opening (a sealing port) side.

Accordingly, a wrinkle on an envelope can be reduced at the time of the automatic two-sided printing.

The same can be applied to an envelope set in the sheet feeding cassette 4.

Next, an envelope in a state in which a flap thereof is closed is described.

In a case where the automatic two-sided printing is performed on an envelope in a state in which a flap thereof is closed, if the envelope is conveyed in an orientation in which a flap fold is in a direction substantially perpendicular to the conveyance direction, the flap may be opened during conveyance. For example, in a case where the automatic two-sided printing is performed on an envelope set in an orientation illustrated in FIG. 10B, there is a possibility that the flap may be turned up from when fixing is performed on the first surface to when fixing is performed on the second surface. This is because the envelope is conveyed in a state in which the flap fold is at the leading edge in the conveyance direction until the time of fixing on the first surface, but the envelope is conveyed in a state in which the flap fold is at the trailing edge in the conveyance direction at the time of passing through the two-sided printing conveyance path 47 and the time of fixing on the second surface.

A shape of an envelope in a state in which a flap thereof is closed is, for example, the one illustrated in FIGS. 21C and 21D, and an envelope having a flap on a long side like a Western-style Long Y3 envelope is often sold in a state in which a flap thereof is closed.

Therefore, according to the present exemplary embodiment, in a case where an envelope is placed on the manual sheet feeding tray 207 to be introduced into the fixing nip portion N in an orientation in which a flap fold (a bottom fold) extends in the width direction, execution of the automatic two-sided printing using the envelope is inhibited.

Further, in a case where an envelope is placed on the manual sheet feeding tray 207 in an orientation in which a flap fold (a bottom fold) extends in the conveyance direction, execution of the automatic two-sided printing using the envelope is enabled. More specifically, in a case where the automatic two-sided printing is performed on an envelope in a state in which a flap thereof is closed, the envelope is conveyed to be introduced into the fixing nip portion N in the orientation in which the flap fold extends in a direction substantially parallel to the conveyance direction. In a case where the envelope is conveyed in the orientation in which the flap fold extends in the direction substantially parallel to the conveyance direction, a direction in which the flap can be opened is perpendicular to the conveyance direction, and thus there is no possibility that the flap is opened during conveyance.

The same can be applied to an envelope set in the sheet feeding cassette 4.

<Registration of Recording Material Set on Placement Unit>

Information about a sheet placed on the placement unit such as the sheet feeding cassette 4 and the manual sheet feeding tray 207 is registered by an operator via the operation unit 200.

Figure 5:
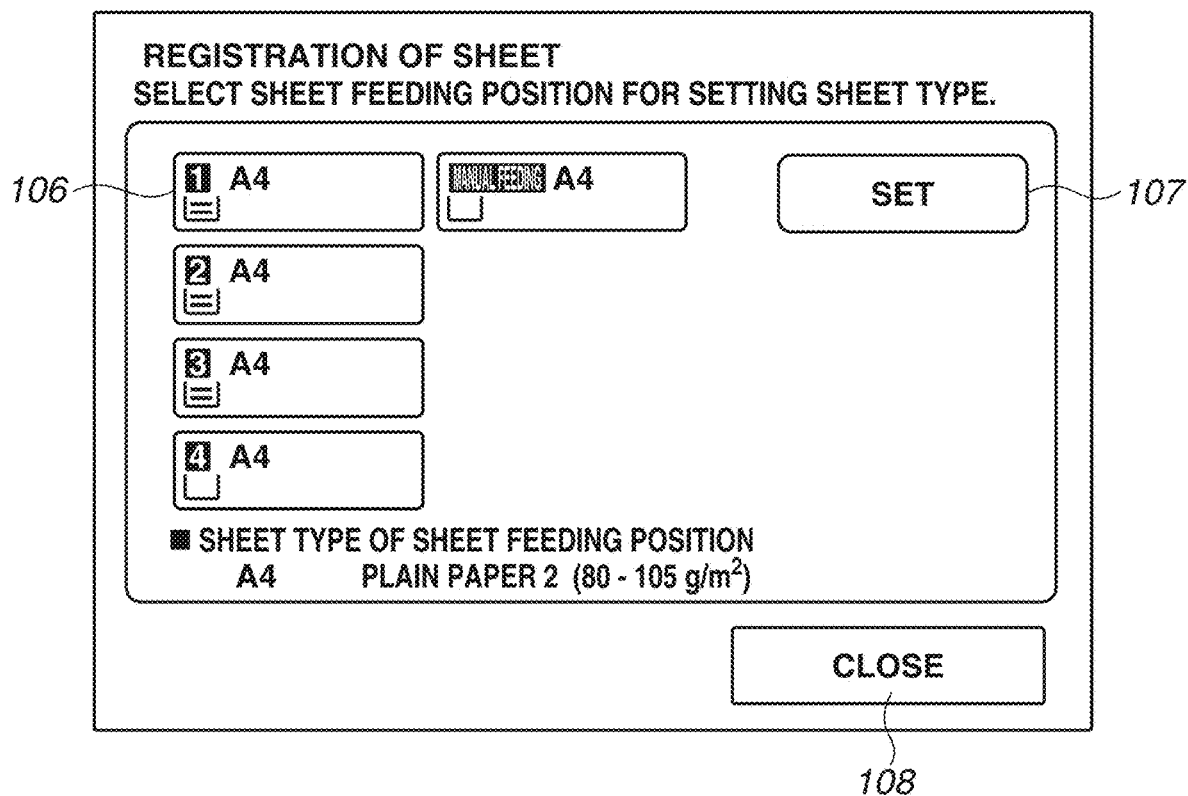
FIG. 5 is a diagram illustrating an example of a sheet registration screen of a sheet feeding unit.
Figure 6:
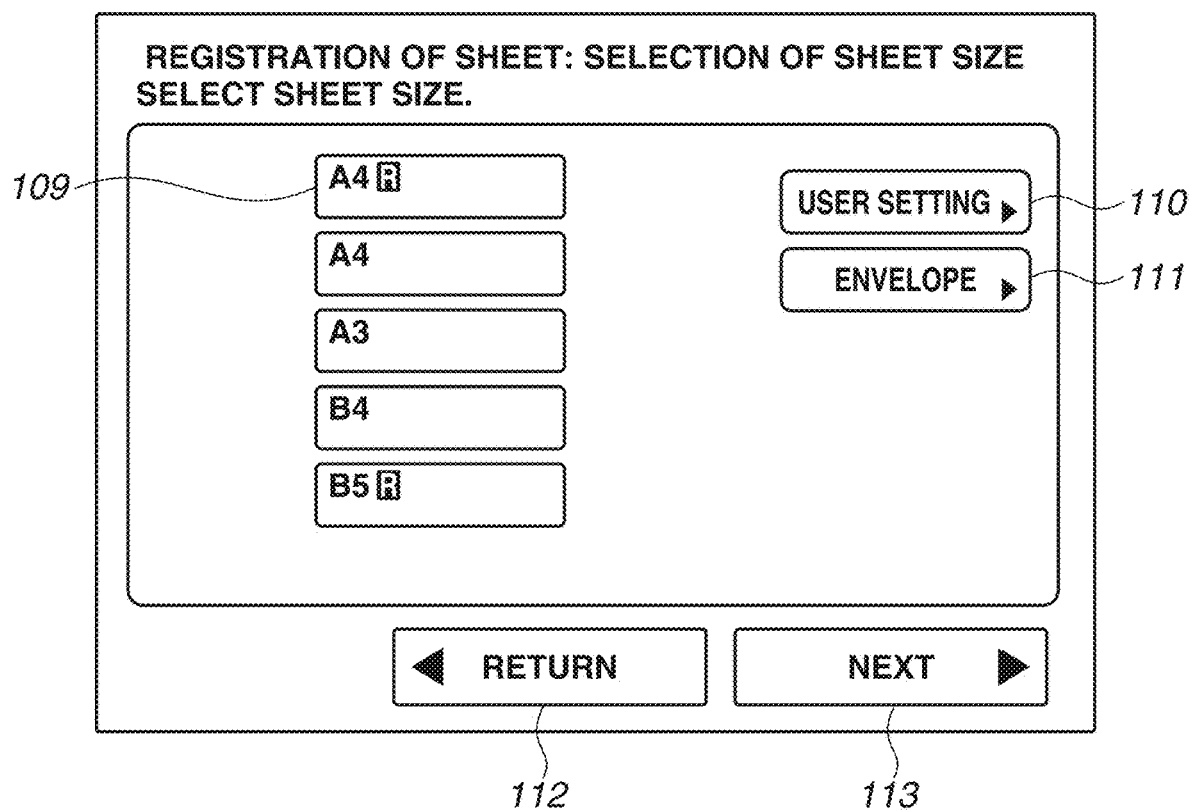
FIG. 6 is a diagram illustrating an example of a display screen for setting a sheet size.

FIGS. 5 and 6 illustrate examples of a sheet registration screen.

The screen in FIG. 5 is displayed on the operation display unit 201 in a case where an operator selects a sheet setting item from the user mode screen. FIG. 5 illustrates a selection screen for a sheet feeding stage, and selection buttons 106 for sheet feeding stages corresponding to the sheet feeding cassette 4, the manual sheet feeding tray 207, and the like are displayed. The operator can select any one of the sheet feeding stages by pressing corresponding one of the selection buttons 106.

In addition, the operator presses a setting button 107 after selecting the sheet feeding stage in order to select a paper type to be used in the specified sheet feeding stage. Accordingly, the operation unit 200 displays a sheet selection screen as illustrated in FIG. 6 on the operation display unit 201. The sheet selection screen is used by the operator to register a size and a type (an envelope or a flat sheet in this case) of a sheet to be set in the sheet feeding stage specified on the screen in FIG. 5. For example, sheet sizes which can be used in the sheet feeding stage selected on the screen in FIG. 5 are listed in the screen in FIG. 6.

A method for sheet registration in the sheet feeding stage in a case where an envelope is specified as a recording material and a content to be displayed on the operation display unit 201 are described below with reference to a flowchart and drawings.

Figure 7:
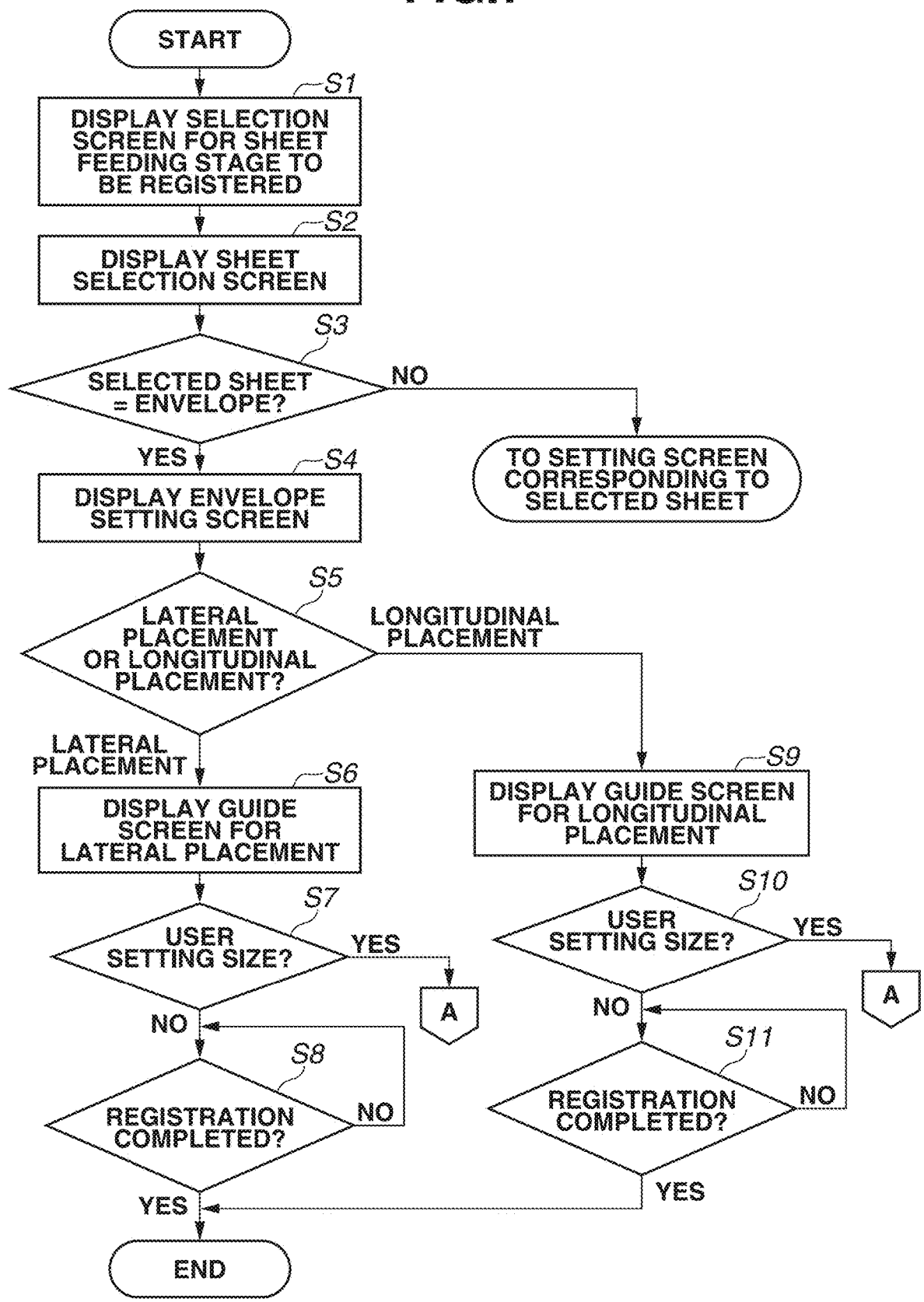
FIG. 7 is a flowchart illustrating sheet registration in a case where an envelope is set in the sheet feeding unit.

FIG. 7 is a flowchart according to the present exemplary embodiment.

In a case where an operator selects a sheet setting item from the user mode screen, in step S1, the CPU 300 displays a selection screen for the sheet feeding stage as illustrated in FIG. 5 on the operation display unit 201. In step S2, in a case where the operator selects the sheet feeding stage on which the envelope is placed, the CPU 300 displays the sheet selection screen as illustrated in FIG. 6. In step S3, in a case where the sheet selected in the sheet selection screen is not an envelope (NO in step S3), the CPU 300 shifts the screen to a setting screen corresponding to the selected sheet.

Figure 9A:
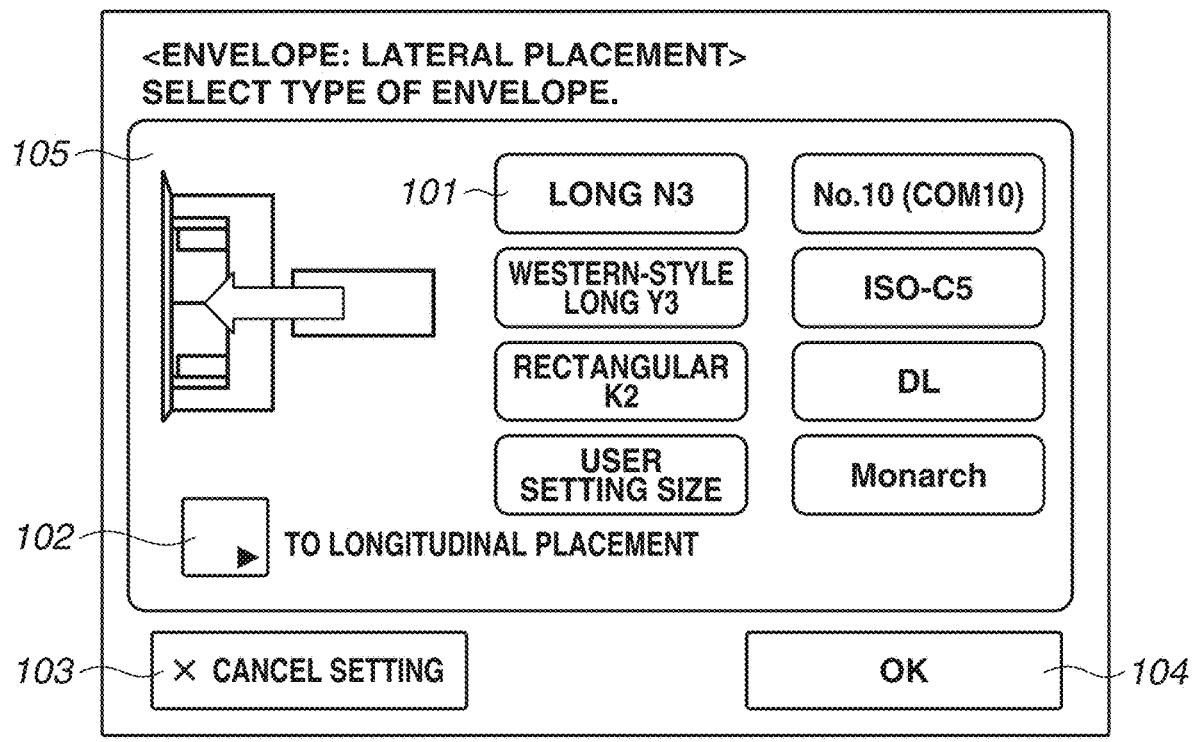
FIG. 9A is a diagram illustrating an example of a display screen in a case where an envelope (lateral placement) is selected.

In a case where a button 111 (FIG. 6) for specifying an envelope is pressed on the sheet selection screen, and the envelope is selected, the CPU 300 determines that the selected sheet is the envelope (YES in step S3), and, in step S4, the CPU 300 displays an envelope setting screen as illustrated in FIG. 9A. In step S4, the CPU 300 may display a screen in FIG. 9B. On the envelope setting screen, setting buttons 101 for selecting a type of an envelope are displayed. The operator presses a button corresponding to the type of the envelope to be set in the sheet feeding stage from the setting buttons 101 and specifies the type of the envelope. The CPU 300 obtains information corresponding to the size and a placement direction (lateral placement or longitudinal placement) of the envelope from an input of an instruction by the operator based on the display on the envelope setting screen. In other words, the CPU 300 (and the operation unit 200) functions as a reception unit for receiving an input of the information corresponding to the placement direction of the envelope.

Specifically, the CPU 300 displays a switch button 102 for specifying a setting direction of an envelope separately from the setting buttons 101 for selecting a type of an envelope. The CPU 300 causes the operator to specify a direction for setting the envelope (longitudinal placement or lateral placement) before specifying the type of the envelope. The operator can switch a setting screen for the longitudinal placement (FIG. 9B) and a setting screen for the lateral placement (FIG. 9A) by pressing the switch button 102 for the setting direction of the envelope. The switch button 102 functions as a selection button for the longitudinal placement or the lateral placement.

In steps S6 and S9, the CPU 300 switches a guide image 105 for the envelope setting direction to be displayed on the operation display unit 201 depending on the direction selected by the switch button 102 in step S5. In step S5, in a case where the lateral placement is selected by the switch button 102 (LATERAL PLACEMENT in step S5), in step S6, the CPU 300 displays a guide screen for the lateral placement as illustrated in FIG. 9A. In a case where the longitudinal placement is selected by the switch button 102 (LONGITUDINAL PLACEMENT in step S5), in step S9, the CPU 300 displays a guide screen for the longitudinal placement as illustrated in FIG. 9B.

Figure 9B:
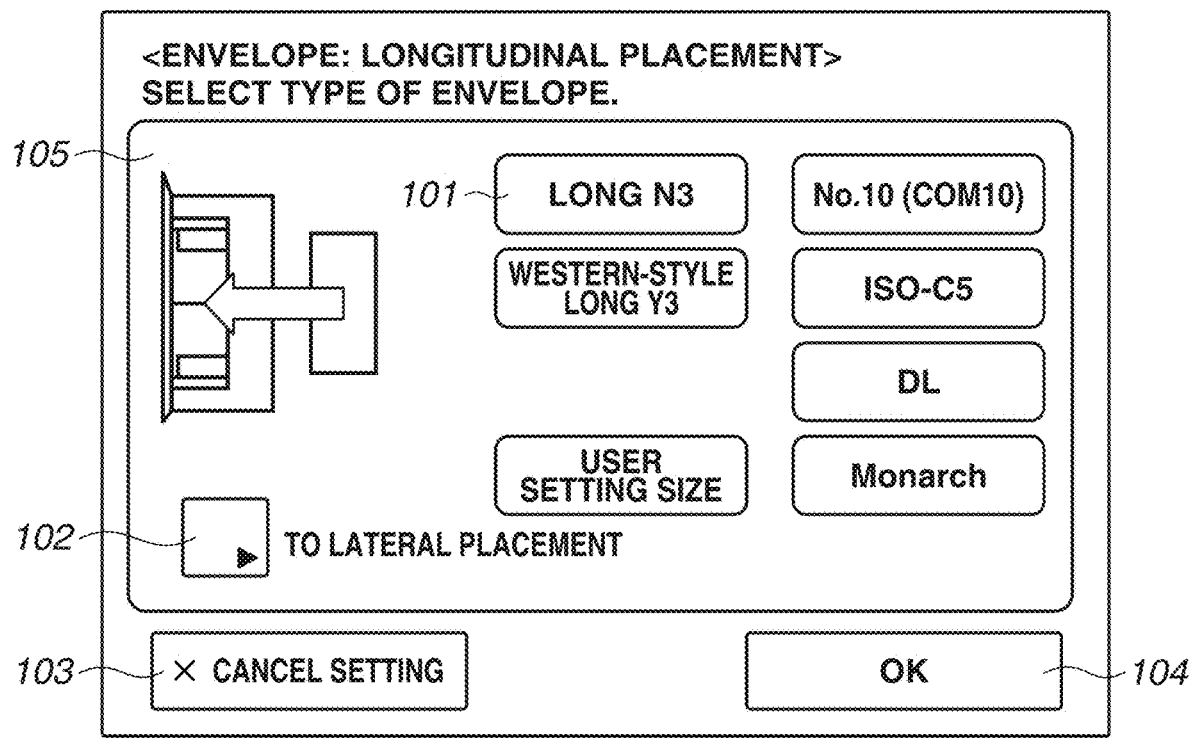
FIG. 9B is a diagram illustrating an example of a display screen in a case where an envelope (longitudinal placement) is selected.

According to the present exemplary embodiment, FIGS. 9A and 9B (and FIGS. 10A, 10B, 13A, 13B, and 15 described below) illustrate the guide image 105 for the setting direction in a case where the envelope is set on the manual sheet feeding tray 207 as an example. In a case where the placement unit subjected to the sheet registration is the sheet feeding cassette 4, the CPU 300 displays a screen in which the guide image 105 indicates the setting direction in the sheet feeding cassette 4.

The CPU 300 displays a type (size) setting button for the envelope which can be placed according to the selected setting direction. In FIGS. 9A and 9B, setting buttons for standard-size envelopes are displayed, and a setting of a non-standard-size envelope is input by pressing a user setting size button. For example, regarding an envelope which can be set in both directions namely the longitudinal placement and the lateral placement, the setting buttons 101 are displayed on both the screens for the longitudinal placement and the lateral placement like "Long N3" and "Western-style Long Y3" illustrated in FIGS. 9A and 9B. Meanwhile, regarding an envelope which can be set in only either one of the longitudinal placement and the lateral placement (or which is not recommended to be used), the type of the envelope can be selected only on a screen for the setting direction in which the envelope can be set. For example, "Rectangular K2" illustrated in FIGS. 9A and 9B can be set in the lateral placement but cannot be set in the longitudinal placement since a size in the width direction is larger than a sheet passing width of the image forming apparatus 100. Therefore, "Rectangular K2" can be selected in the guide screen for the lateral placement. In a case where the switch button 102 for the setting direction is pressed on the setting screen for the lateral placement in FIG. 9A, the screen of the operation display unit 201 is shifted to the setting screen for the longitudinal placement in FIG. 9B. The CPU 300 does not display an option of "Rectangular K2" or displays the option of "Rectangular K2" in a grayout state on the setting screen for the longitudinal placement in FIG. 9B, so that the Rectangular K2 envelope cannot be selected. The operator selects the type of the envelope on either of the screens in FIGS. 9A and 9B.

In a case where the type of the envelope is selected on the screen in FIG. 9A or 9B, the guide image 105 is displayed which matches a shape of the envelope based on inputs of the setting direction and the size of the envelope. More specifically, the CPU 300 displays an image indicating which orientation the flap of the envelope is to be set on the operation display unit 201 and guides the operator in the setting direction. This guide enables the CPU 300 to determine whether the envelope set in the sheet feeding stage is set to be conveyed in the orientation in which the bottom fold of the envelope extends in the conveyance direction or in the orientation in which the bottom fold of the envelope extends in the width direction.

For example, FIG. 10A illustrates a state after "Western-style Long Y3" is selected on the screen in FIG. 9A and before an OK button 104 is pressed, and FIG. 10B illustrates a state after "Western-style Long Y3" is selected on the screen in FIG. 9B and before the OK button 104 is pressed. Accordingly, in a case where the envelope set on the manual sheet feeding tray 207 is the Western-style Long Y3 envelope, and the setting direction is the lateral placement, the CPU 300 can determine that the envelope is set to be conveyed in the orientation in which the bottom fold extends in the conveyance direction. Further, in a case where the envelope set on the manual sheet feeding tray 207 is the Western-style Long Y3 envelope, and the setting direction is the longitudinal placement, the CPU 300 can determine that the envelope is set to be conveyed in the orientation in which the bottom fold extends in the width direction. The CPU 300 can perform similar determination on the sheet feeding stage other than the manual sheet feeding tray 207.

Figure 13A:
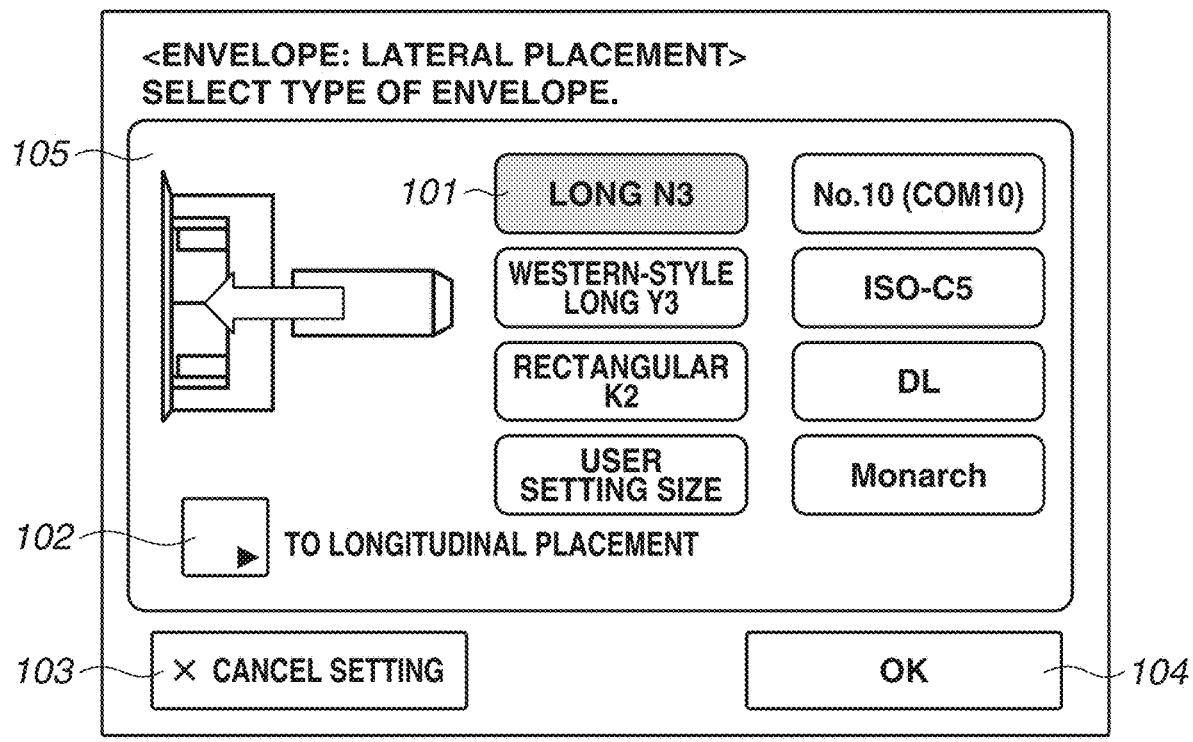
FIG. 13A is a diagram illustrating an examples of a display screen in a case where Long N3 (lateral placement) is selected.
Figure 13B:
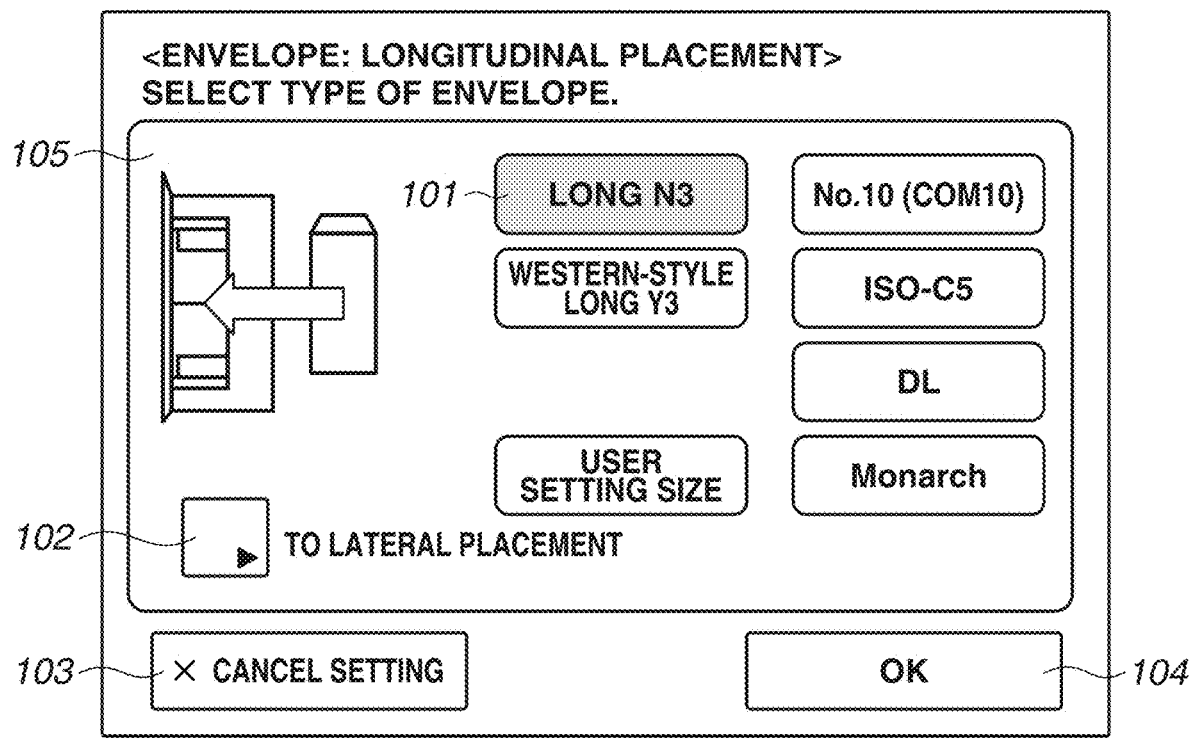
FIG. 13B is a diagram illustrating an example of a display screen in a case where Long N3 (longitudinal placement) is selected.
Figure 14:
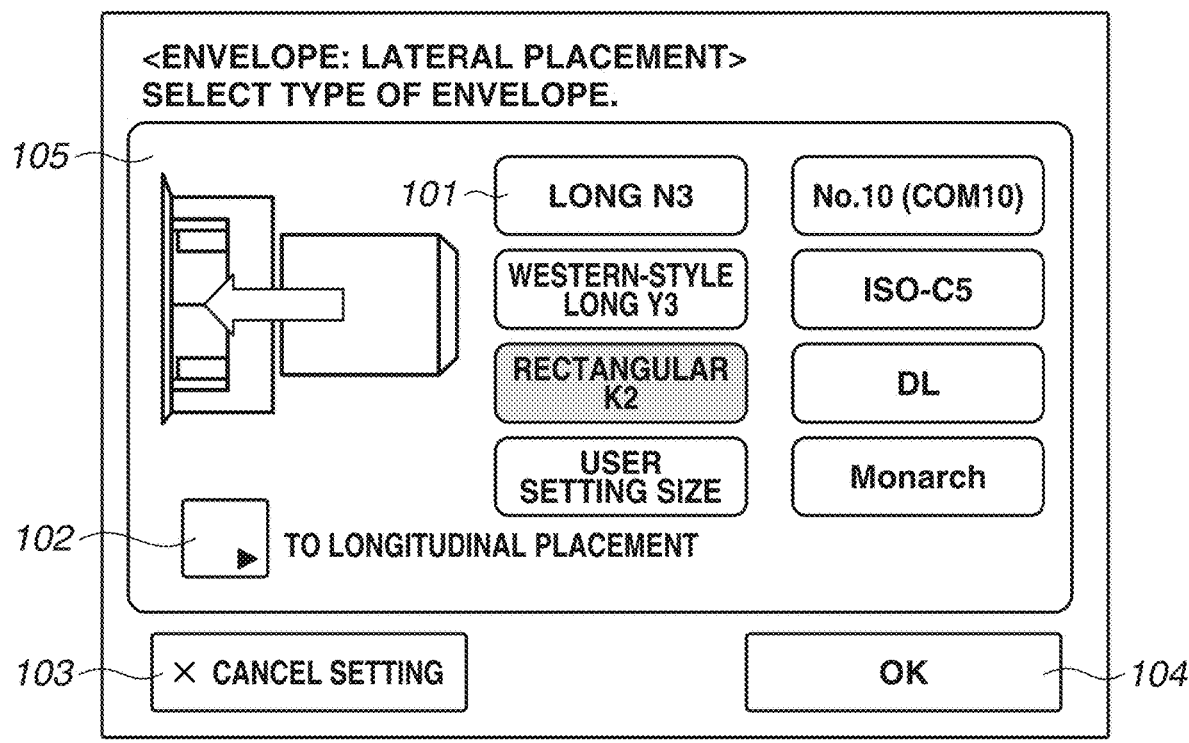
FIG. 14 is a diagram illustrating an example of a display screen in a case where Rectangular K2 (lateral placement) is selected.

Further, for example, FIG. 13A illustrates a state after "Long N3" is selected on the screen in FIG. 9A and before the OK button 104 is pressed, and FIG. 13B illustrates a state after "Long N3" is selected on the screen in FIG. 9B and before the OK button 104 is pressed In other words, in a case where the envelope set on the manual sheet feeding tray 207 is the Long N3 envelope, and the setting direction is the lateral placement, the CPU 300 can determine that the envelope is set to be conveyed in the orientation in which the bottom fold extends in the width direction. Further, in a case where the envelope set on the manual sheet feeding tray 207 is the Long N3 envelope, and the setting direction is the longitudinal placement, the CPU 300 can determine that the envelope is set to be conveyed in the orientation in which the bottom fold extends in the conveyance direction. The CPU 300 can perform similar determination on the sheet feeding stage other than the manual sheet feeding tray 207.

FIG. 16 indicates types and sizes of representative standard-size envelopes. FIG. 16 further illustrates examples of orientations in a case where each of the standard-size envelopes is set on the manual sheet feeding tray.

In a case where a user setting size is selected (YES in steps S7 and S10), the CPU 300 shifts the screen to an input screen for the user setting size. A screen for the user setting size is described below according to a second exemplary embodiment.

In a case where a size other than the user setting size is selected (NO in steps S7 and S10), in steps S8 and S11, the CPU 300 determines that the sheet registration is completed upon pressing of the OK button 104. The CPU 300 stores the type (the size) and the setting direction of the set envelope in a memory in association with the sheet feeding stage.

<Print Setting>

Next, a flowchart for print setting in a case where a copy operation and a print operation are executed is described with reference to FIG. 8.

An operator operates the operation unit 200 of the image forming apparatus 100 and can set an image forming condition of a copy operation and a print operation to be executed on a print setting screen.

In a case where an operator inputs an instruction to display the print setting screen, in step S101, the CPU 300 displays the print setting screen. On the print setting screen, image forming conditions such as specification of a sheet to be used for printing, selection of whether to perform the two-sided printing or the one-sided printing, and the number of print copies can be set by an input of an instruction from the operator. In other words, the CPU 300 and the operation unit 200 function as an input unit (the reception unit) to which the above-described information can be input. A method for specifying a sheet to be used for printing, the operator may be caused to select the sheet feeding stage for feeding a sheet, and image forming may be performed on a sheet placed in the selected sheet feeding stage, or the operator may be caused to select a sheet on which an image is formed and, a sheet may be fed from the sheet feeding stage in which the selected sheet is placed.

In a case where a sheet to be used for image forming is not an envelope (NO in step S102), the CPU 300 executes printing corresponding to the selected sheet.

In a case where a sheet to be used for image forming is an envelope (YES in step S102), and the two-sided printing is not to be performed (in other words, the one-sided printing is selected) (NO in step S103), in step S104, the CPU 300 executes the one-sided printing.

In a case where a sheet to be used for image forming is an envelope (YES in step S102), and the two-sided printing is selected (YES in step S103), the CPU 300 confirms a direction in which the specified envelope is placed. For example, if the envelope is set in the sheet feeding stage at a point of time before the print setting screen is displayed, the setting direction is already registered by the operator as the information about the envelope set in association with the sheet feeding stage as described above with reference to the flowchart in FIG. 7. The CPU 300 obtains the setting direction based on the registered information regarding the sheet feeding stage in which the envelope selected in step S101 is set. Alternatively, in a case where the envelope is set in the sheet feeding stage selected in step S101, the CPU 300 obtains the setting direction based on the information registered in the sheet registration of the selected sheet feeding stage. In other words, the CPU 300 functions as the reception unit for receiving information corresponding to the orientation of the bottom fold of the envelope.

In step S106, the CPU 300 determines whether the orientation of the set envelope is the orientation in which the bottom fold of the envelope is conveyed in parallel to the conveyance direction of the envelope based on the information about the sheet registration (FIG. 7).

In a case where the setting direction of the selected envelope is the direction in which the envelope is conveyed in the orientation in which the bottom fold of the envelope extends in the conveyance direction (YES in step S106), in step S107, the CPU 300 enables execution of the automatic two-sided printing using the envelope and executes the two-sided printing. For example, in a case where a Western-style Long Y3 envelope which is set on the manual sheet feeding tray 207 in the lateral placement is selected as a sheet to be used for printing as illustrated in FIG. 10A, execution of the two-sided printing is enabled as the envelope of which the bottom fold is parallel to the conveyance direction. Further, for example, in a case where a Long N3 envelope which is set on the manual sheet feeding tray 207 in the longitudinal placement is selected as a sheet to be used for printing as illustrated in FIG. 13B, execution of the two-sided printing is enabled as the envelope of which the bottom fold is parallel to the conveyance direction.

Meanwhile, in a case where the setting direction of the selected envelope is the direction in which the envelope is conveyed in the orientation in which the bottom fold of the envelope extends in the width direction (NO in step S106), in step S108, the CPU 300 determines whether the setting direction of the envelope can be changed.

For example, in a case where the selected envelope has a size which can be conveyed only in the orientation in which the bottom fold extends in the width direction as in the case of a Rectangular K2 envelope, the setting direction cannot be changed. In this case (NO in step S108), in step S109, the CPU 300 inhibits the automatic two-sided printing on the selected envelope. In step S104, the CPU (a notification unit) 300 notifies the operator that the automatic two-sided printing cannot be executed and executes the one-sided printing.

In a case where the selected envelope has a size which can be conveyed in the orientation in which the bottom fold extends in the conveyance direction, the setting direction can be changed. For example, in a case where the Western-style Long Y3 envelope which is set on the manual sheet feeding tray 207 in the longitudinal placement is selected as the sheet to be used for printing as illustrated in FIG. 10B, there is no possibility that the flap is turned up by changing the placement direction to the lateral placement. Further, for example, in a case where the Long N3 envelope which is set on the manual sheet feeding tray 207 in the lateral placement is selected as a sheet to be used for printing as illustrated in FIG. 13A, a wrinkle is not to be formed on the envelope if the placement direction is changed to the longitudinal placement.

In this case (YES in step S108), in step S110, the CPU 300 displays a screen for prompting the operator to change the setting direction of the selected envelope on the operation display unit 201. In other words, the CPU 300 prompts the operator to change the placement direction to the setting direction in which the envelope is conveyed in the orientation in which the bottom fold extends in the conveyance direction. The CPU 300 may notify the operator of a possibility that a wrinkle may be formed on the envelope by the automatic two-sided printing because of the current setting direction, by displaying a message such as "there is a possibility that a wrinkle is formed on the envelope" on the operation unit 200. The CPU 300 displays, for example, a screen for inputting whether the setting direction of the selected envelope is changed and obtains information about whether the operator has changed the setting direction of the envelope. In a case where the operator does not want to change the setting direction of the envelope, the operator can input information indicating that the setting direction is not changed.

In a case where the setting direction of the selected envelope is changed to a direction in which the envelope is conveyed in the orientation in which the bottom fold extends in the conveyance direction (YES in step S111), in step S107, the CPU 300 enables the automatic two-sided printing and executes the automatic two-sided printing.

In a case where the setting direction of the selected envelope is not changed (NO in step S111), in step S109, the CPU 300 inhibits the automatic two-sided printing on the selected envelope. In step S104, the CPU (the notification unit) 300 notifies the operator that the automatic two-sided printing cannot be executed and executes the one-sided printing.

Figure 8:
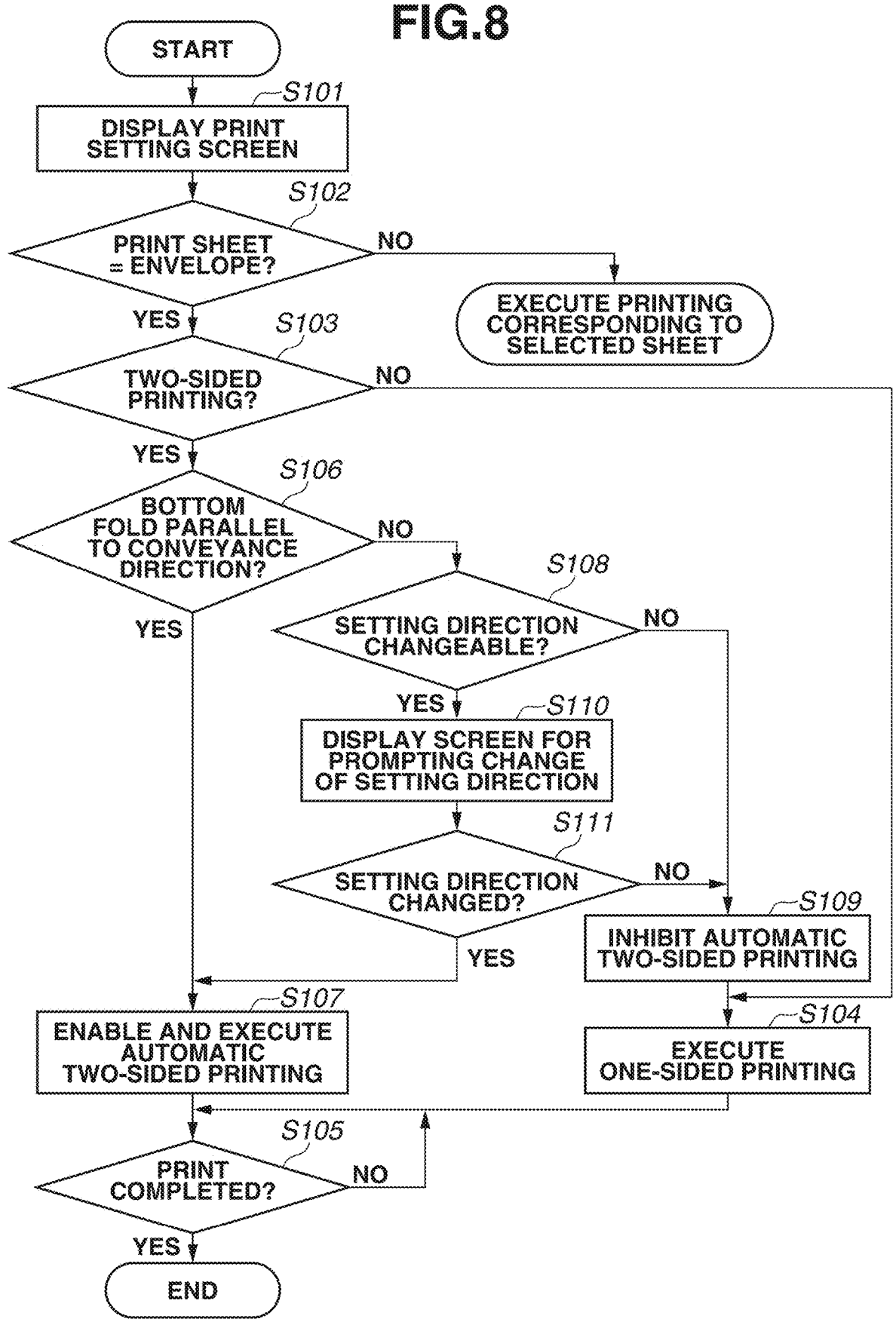
FIG. 8 is a flowchart illustrating processing for enabling and inhibiting of automatic two-sided printing on an envelope.

In step S105, upon completion of printing (YES in step S105), processing in the flowchart in FIG. 8 is terminated.

As described above, the CPU 300 determines the placement direction of the envelope from the information about the setting direction of the envelope (lateral placement or longitudinal placement) and the information about the type of the envelope and determines whether the automatic two-sided printing can be performed on the envelope, whereby formation of a wrinkle on the envelope can be reduced.

According to the present exemplary embodiment, information about the lateral placement and the longitudinal placement is registered as information about the setting direction of the envelope, and position information about the bottom fold in the setting direction of the envelope is indirectly obtained. However, the position information about the bottom fold may be directly registered, and the position information about the bottom fold may be directly obtained. More specifically, the position information about the bottom fold may be obtained indirectly or directly. The CPU 300 also functions as an obtainment unit for obtaining the position information about the bottom fold.

According to the first exemplary embodiment, a case in which a standard-size envelope is registered in a registration screen for an envelope to be set in the placement unit is described as an example.

According to the second exemplary embodiment, a case in which a non-standard-size envelope is registered in a registration screen for an envelope to be set in the placement unit is described as an example. In the following descriptions, major differences from the first exemplary embodiment are mainly described. Configurations which are similar to those according to the first exemplary embodiment are denoted by the same reference numerals, and the detail descriptions thereof are omitted.

<Registration of Recording Material Set on Placement Unit>

In a case where a non-standard-size envelope is set in the placement unit such as the sheet feeding cassette 4 and the manual sheet feeding tray 207, information regarding a sheet is registered by an operator via the operation unit 200.

A method for sheet registration in the sheet feeding stage in a case where a non-standard-size envelope is specified as a recording material and a content to be displayed on the operation display unit 201 are described with reference to the flowchart in FIG. 7 diverted from the first exemplary embodiment and a flowchart in FIG. 17 described according to the present exemplary embodiment.

The processing in steps S1 to S5 in the flowchart in FIG. 7 is just as described according to the first exemplary embodiment, so that the description thereof is omitted.

Figure 18:
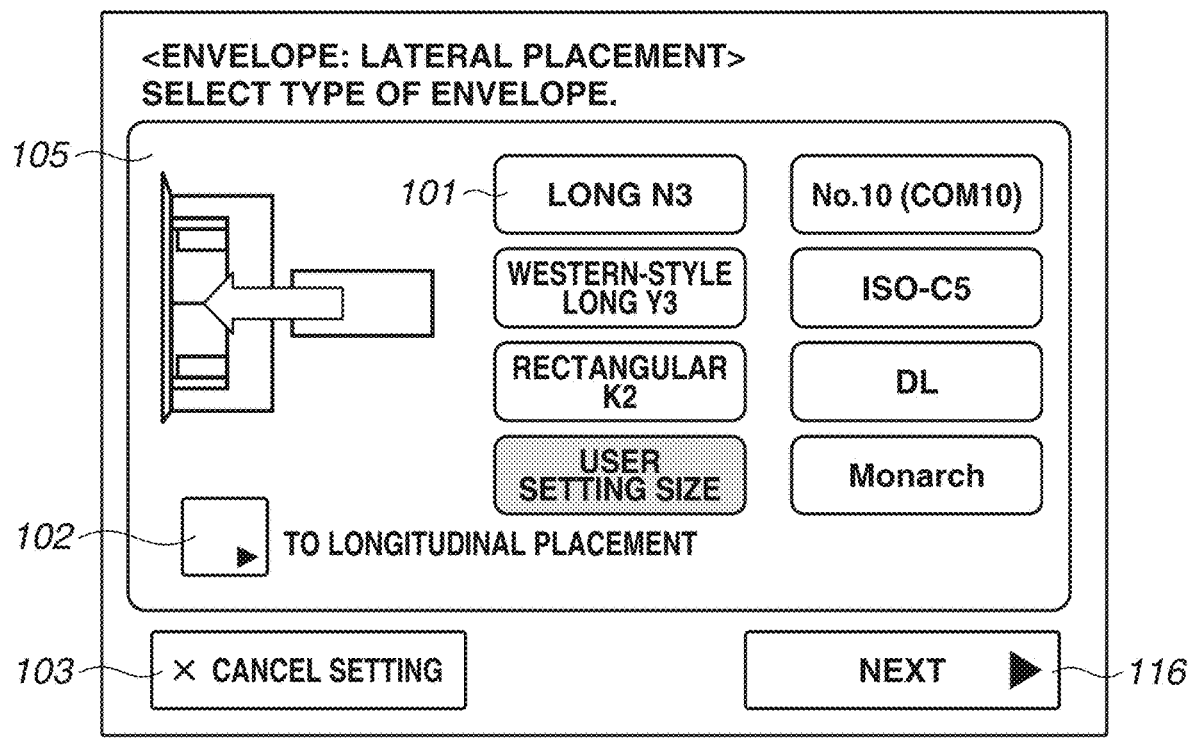
FIG. 18 is a diagram illustrating an example of a display screen in a case where a user setting size is selected.

In step S5, in a case where the lateral placement is selected by the switch button 102 (LATERAL PLACEMENT in step S5), in step S6, the CPU 300 displays the guide screen for the lateral placement as illustrated in FIG. 9A. In a case where the longitudinal placement is selected by the switch button 102 (LONGITUDINAL PLACEMENT in step S5), in step S9, the CPU 300 displays the guide screen for the longitudinal placement as illustrated in FIG. 9B. In a case where an envelope other than the standard-size envelopes displayed as the options is set, an operator selects the user setting size in either of the screens in FIGS. 9A and 9B. For example, FIG. 18 illustrates a state in which the user setting size is selected in the screen in FIG. 9A (the case of the lateral placement).

In a case where the user setting size is selected, and a next button 116 is selected (YES in steps S7 and S10), in step S301 in FIG. 17, the CPU 300 shifts the screen to an input screen for the user setting size.

Figure 19A:
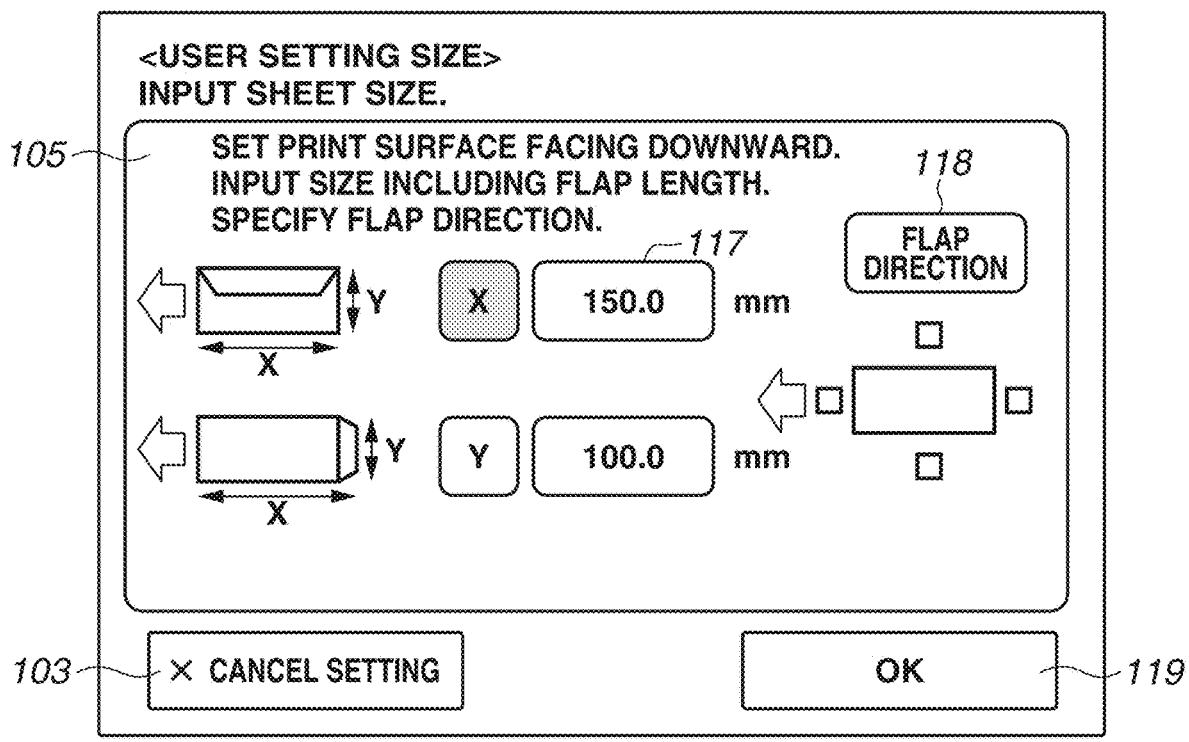
FIGS. 19A to 19C are diagrams each illustrating an example of an input screen for a sheet size in the user setting size.
Figure 19B:
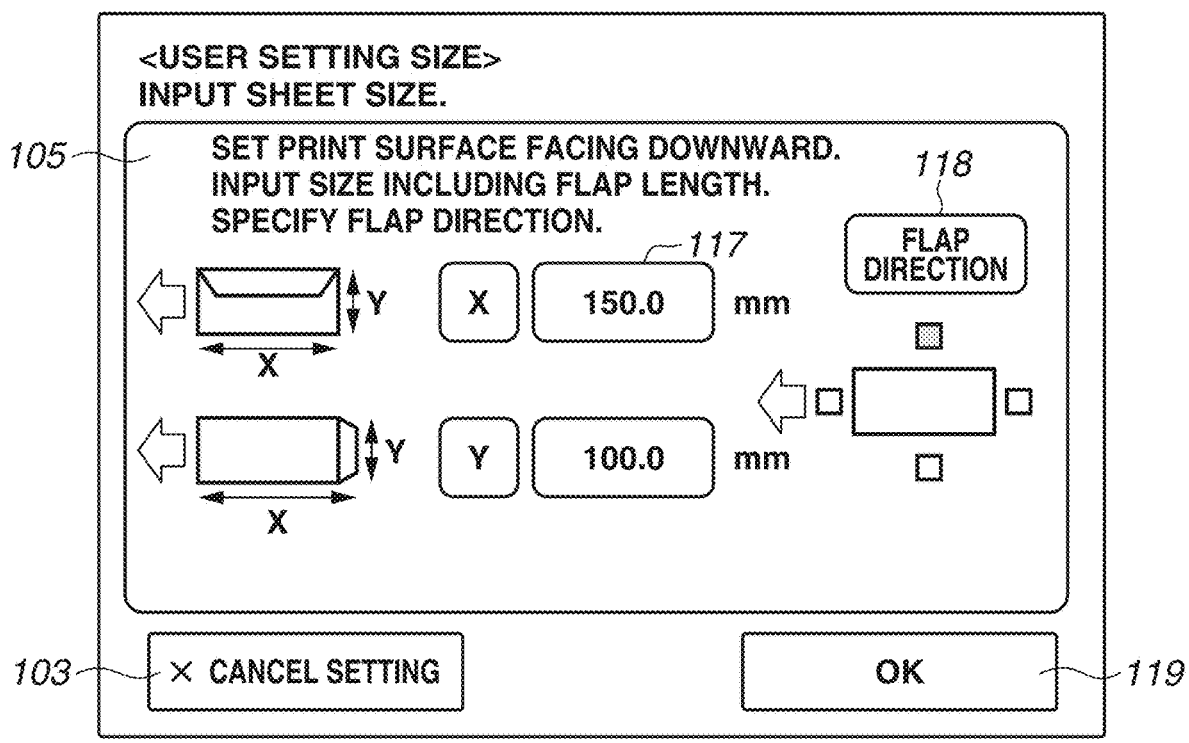
Figure 19C:
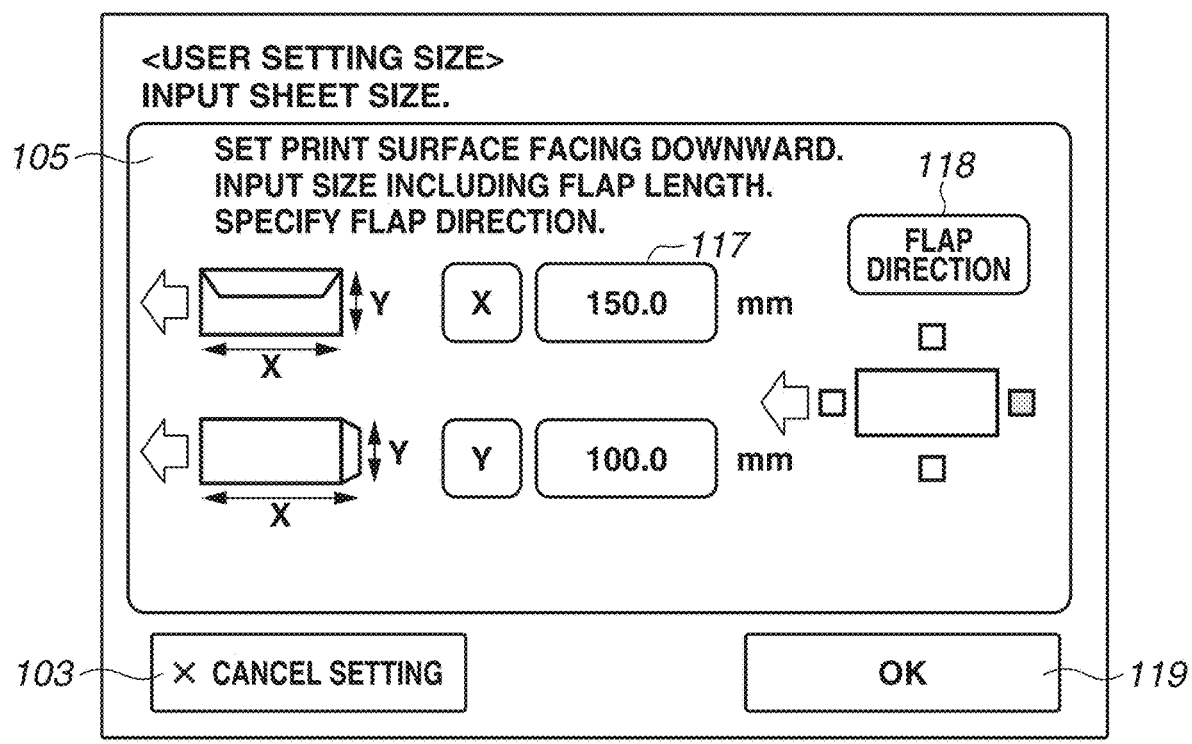

FIGS. 19A to 19C illustrate examples of the input screen for the user setting size displayed on the operation display unit 201 in step S301. Specifically, the input screen includes an input portion 117 for inputting a size X in the conveyance direction and a length Y in the width direction of the set envelope. The input screen further includes a selection button 118 for inputting an orientation of a flap. Regarding the placement direction of the envelope, a flap position is easy to understand for the operator. Therefore, according to the present exemplary embodiment, the input screen has a configuration for causing an operator to specify the flap position (more specifically, a side having the flap in a case where the envelope is schematically illustrated as a quadrilateral) to obtain information about a position of the bottom fold. FIG. 19B illustrates an example of a screen in which a setting of an orientation in which the bottom fold extends in the conveyance direction is selected by the selection button 118. FIG. 19C illustrates an example of a screen in which a setting of an orientation in which the bottom fold extends in the width direction is selected by the selection button 118. In addition, the CPU 300 displays the guide image 105 so that the operator can recognize the placement direction of the envelope and a size to be input. In a case where a setting cancel button 103 is selected, the CPU 300 returns the display to, for example, the screen illustrated in FIG. 18 and can shift to selection of the standard-size envelope.

The CPU 300 displays the screens illustrated in FIGS. 19A to 19C and prompts the operator to input the information corresponding to the size and the flap position of the envelope to be set. Position information about the flap corresponds to the orientation of the bottom fold of the envelope. Therefore, the CPU (the reception unit) 300 receives an input of the position information about the flap and the information about the sheet feeding stage to be registered (in step S1) and can obtain information about whether the envelope is set to be conveyed in the orientation in which the bottom fold thereof extends in the conveyance direction.

In a case where pieces of information about the sizes X and Y and the flap position of the envelope are input (YES in steps S302 and S303), and an OK button 119 is pressed in step S304, the CPU 300 determines that registration of the envelope having the user setting size is completed. The CPU 300 stores the type (the size) and the setting direction of the set envelope in the memory in association with the sheet feeding stage.

<Print Setting>

Processing in the flowchart for print setting in a case where a copy operation and a print operation are executed is similar to that described according to the first exemplary embodiment. In other words, processing is similar to that in the flowchart in FIG. 8, and the detail description thereof is omitted.

In a case where an operator inputs an instruction to display the print setting screen, in step S101, the CPU 300 displays the print setting screen and obtains image forming conditions such as specification of a sheet to be used for printing, selection of whether to perform the two-sided printing or the one-sided printing, and the number of print copies by an input of an instruction from the operator. In other words, the CPU 300 and the operation unit 200 function as the input unit (the reception unit) to which the above-described information can be input.

In a case where a sheet to be used for image forming is an envelope (YES in step S102), and an instruction to execute the two-sided printing is selected (YES in step S103), the CPU 300 confirms a direction in which the specified envelope is placed. For example, if the envelope is set in the sheet feeding stage at a point of time before the print setting screen is displayed, the setting direction is already registered by the operator as the information about the envelope set in association with the sheet feeding stage as described above with reference to the flowchart in FIG. 7. In a case where the registered information is the user setting size, the CPU 300 obtains the setting direction based on the position information about the flap registered in step S303.

In a case where the setting direction of the selected envelope is the direction in which the envelope is conveyed in the orientation in which the bottom fold of the envelope extends in the conveyance direction (YES in step S106), in step S107, the CPU 300 enables execution of the automatic two-sided printing using the envelope and executes the two-sided printing. For example, in a case where the envelope in the sheet feeding stage registered as illustrated in FIG. 19B is used, the envelope is conveyed in the orientation in which the bottom fold of the envelope extends in the conveyance direction, and thus execution of the two-sided printing is enabled.

Meanwhile, in a case where the setting direction of the selected envelope is the direction in which the envelope is conveyed in the orientation in which the bottom fold of the envelope extends in the width direction (NO in step S106), in step S108, the CPU 300 determines whether the setting direction of the envelope can be changed. For example, in a case where the envelope in the sheet feeding stage registered as illustrated in FIG. 19C is used, the envelope is conveyed in the orientation in which the bottom fold of the envelope extends in the width direction, and the processing proceeds to step S108.

In a case where the selected envelope has a size which can be conveyed only in the orientation in which the bottom fold extends in the width direction, the setting direction cannot be changed. In this case (NO in step S108), in step S109, the CPU 300 inhibits the automatic two-sided printing on the selected envelope. In step S104, the CPU (the notification unit) 300 notifies the operator that the automatic two-sided printing cannot be executed and executes the one-sided printing.

In a case where the selected envelope has a size which can be conveyed in the orientation in which the bottom fold extends in the conveyance direction, the setting direction can be changed. In this case (YES in step S108), in step S110, the CPU 300 displays a screen for prompting the operator to change the setting direction of the selected envelope on the operation display unit 201. The CPU 300 may notify the operator of a possibility that a wrinkle may be formed on the envelope by the automatic two-sided printing because of the current setting direction, by displaying a message such as "there is a possibility that a wrinkle is formed on the envelope" on the operation unit 200.

In a case where the setting direction of the selected envelope is changed to a direction in which the envelope is conveyed in the orientation in which the bottom fold extends in the conveyance direction (YES in step S111), in step S107, the CPU 300 enables the automatic two-sided printing and executes the automatic two-sided printing.

In a case where the setting direction of the selected envelope is not changed (NO in step S111), in step S109, the CPU 300 inhibits the automatic two-sided printing on the selected envelope. In step S104, the CPU (the notification unit) 300 notifies the operator that the automatic two-sided printing cannot be executed and executes the one-sided printing.

In step S105, upon completion of printing (YES in step S105), processing in the flowchart in FIG. 8 is terminated.

As described above, the CPU 300 determines the placement direction of the envelope based on the position information about the flap and determines whether the automatic two-sided printing can be performed on the envelope, whereby formation of a wrinkle on the envelope can be reduced.

According to the first and the second exemplary embodiments, in a case where the setting direction of an envelope is a direction in which the envelope is introduced into the fixing nip portion N in the orientation in which the bottom fold extends in the width direction, execution of the automatic two-sided printing using the envelope is inhibited.

According to a third exemplary embodiment, execution of the automatic two-sided printing using the envelope is not inhibited but restricted in the above-described case.

Specifically, in a case where the setting direction of the envelope is the direction in which the envelope is introduced into the fixing nip portion N in the orientation in which the bottom fold extends in the width direction, the CPU 300 inquires of an operator about whether the automatic two-sided printing can be performed if an instruction to execute the automatic two-sided printing using the envelope is input. The present exemplary embodiment enables the automatic two-sided printing on an envelope which is conveyed in an orientation in which a bottom fold thereof extends in the width direction only if the operator inputs an instruction to allow the automatic two-sided printing.

Specifically, in a case of NO in step S106 in the flowchart in FIG. 8 according to the first and the second exemplary embodiments, the CPU 300 inquires of an operator about whether to enable the automatic two-sided printing. The CPU 300 notifies the operator of a possibility that a wrinkle may be formed on the envelope by the automatic two-sided printing because of the current setting direction, by displaying a message such as "there is a possibility that a wrinkle is formed on the envelope" on the operation unit 200. In other words, the CPU 300 issues a predetermined notification regarding a wrinkle on an envelope. In a case where the operator inputs an instruction to allow the automatic two-sided printing, the CPU 300 advances the processing to step S107 and executes the automatic two-sided printing. In a case where the operator inputs an instruction not to allow the automatic two-sided printing, the CPU 300 advances the processing to step S109, inhibits the automatic two-sided printing, and executes the one-sided printing. In this case, steps S108, S110, and S111 in the flowchart in FIG. 8 are skipped.

As another specific example, in a case of NO in step S106 in the flowchart in FIG. 8 according to the first and the second exemplary embodiments, the CPU 300 inquires of an operator about whether to enable the automatic two-sided printing. The CPU 300 notifies the operator of a possibility that a wrinkle may be formed on the envelope by the automatic two-sided printing because of the current setting direction, by displaying a message such as "there is a possibility that a wrinkle is formed on the envelope" on the operation unit 200. In other words, the CPU 300 issues a predetermined notification regarding a wrinkle on an envelope. In a case where the operator inputs an instruction to allow the automatic two-sided printing, the CPU 300 advances the processing to step S107 and executes the automatic two-sided printing. In a case where the operator inputs an instruction not to allow the automatic two-sided printing, the CPU 300 advances the processing to step S108 and may prompt the operator to change the setting direction of the envelope.

As yet another specific example, in a case of NO in step S111 in the flowchart in FIG. 8 according to the first and the second exemplary embodiments, the CPU 300 inquires of an operator about whether to enable the automatic two-sided printing. The CPU 300 notifies the operator of a possibility that a wrinkle may be formed on the envelope by the automatic two-sided printing because of the current setting direction, by displaying a message such as "there is a possibility that a wrinkle is formed on the envelope" on the operation unit 200. In other words, the CPU 300 issues a predetermined notification regarding a wrinkle on an envelope. In a case where the operator inputs an instruction to allow the automatic two-sided printing, the CPU 300 advances the processing to step S107 and executes the automatic two-sided printing. In a case where the operator inputs an instruction not to allow the automatic two-sided printing, the CPU 300 advances the processing to step S109, inhibits the automatic two-sided printing, and executes the one-sided printing.

According to the above-described configuration, the image forming apparatus which can satisfy both of a need of an operator who wants to reduce a wrinkle on an envelope and a need of an operator who does not mind a wrinkle on an envelope in the automatic two-sided printing can be provided.

Other configurations are similar to those according to the first and the second exemplary embodiments, so that the descriptions thereof are omitted.

According to the first to the third exemplary embodiments, the processing in the flowchart is described using a case in which an image forming condition is set on the operation unit 200 included in the image forming apparatus 100 as an example. However, an image forming condition may be set on a monitor of the external PC 600 which is connected to the image forming apparatus 100 via the network. In this case, a control unit of the external PC 600 executes the processing in the flowcharts. In this case, the external PC 600 and the image forming apparatus 100 construct an image forming system.

According to the first to the third exemplary embodiments, a case is described as an example in which an envelope is set in advance in the sheet feeding stage before setting of an image forming condition, and printing is performed using the envelope of which sheet information is registered in advance. However, a registration timing of the sheet information is not limited to the above-described one. For example, in a case where an envelope of a type which is not set in the sheet feeding stage is selected in the print setting screen (in step S101), or the manual sheet feeding tray 207 on which a sheet is not set is selected as the sheet feeding stage to be used, processing is performed as follows.

Specifically, in the case of the first exemplary embodiment, the processing proceeds to the flowchart in FIG. 7 immediately after step S101, and information about the sheet set in the sheet feeding stage is registered. A registration method is similar to that described in the flowchart in FIG. 7, so that the description thereof is omitted. Subsequently, the CPU 300 performs determination in steps S102 to S106 based on the registered information.

In the case of the second exemplary embodiment, the processing proceeds to the flowchart in FIG. 7 immediately after step S101, and, in a case where an envelope to be set in the sheet feeding stage has the user setting size, the processing proceeds from step S7 or S10 in FIG. 7 to the flowchart in FIG. 17. Thus, information about the sheet is registered. A registration method is similar to that described in the flowchart in FIG. 7, so that the description thereof is omitted. Subsequently, the CPU 300 performs determination in steps S102 to S106 based on the registered information.

The above-described processing may be applied to the third exemplary embodiment.

According to the first to the third exemplary embodiments, the flowchart is described in which setting of the two-sided printing can be input regardless of the setting direction of the selected envelope, and whether execution of the two-sided printing is enabled is determined after the input. However, the method for print setting is not limited to the above-described one. For example, print setting may be performed by following processing (1) to (3). The following processing (1) to (3) can be applied to either of the first and the second exemplary embodiments.

(1) For example, at a point of time when an envelope set in an orientation with which the two-sided printing is inhibited is selected in the print setting screen (in step S101), setting of the two-sided printing may be disabled by not displaying an option of the two-sided printing or displaying an option of the two-sided printing in a grayout state.

(2) Further, for example, at a point of time when an instruction to execute the two-sided printing is selected in the print setting screen (in step S101), the selectable sheet feeding stage may be limited.

Figure 11:
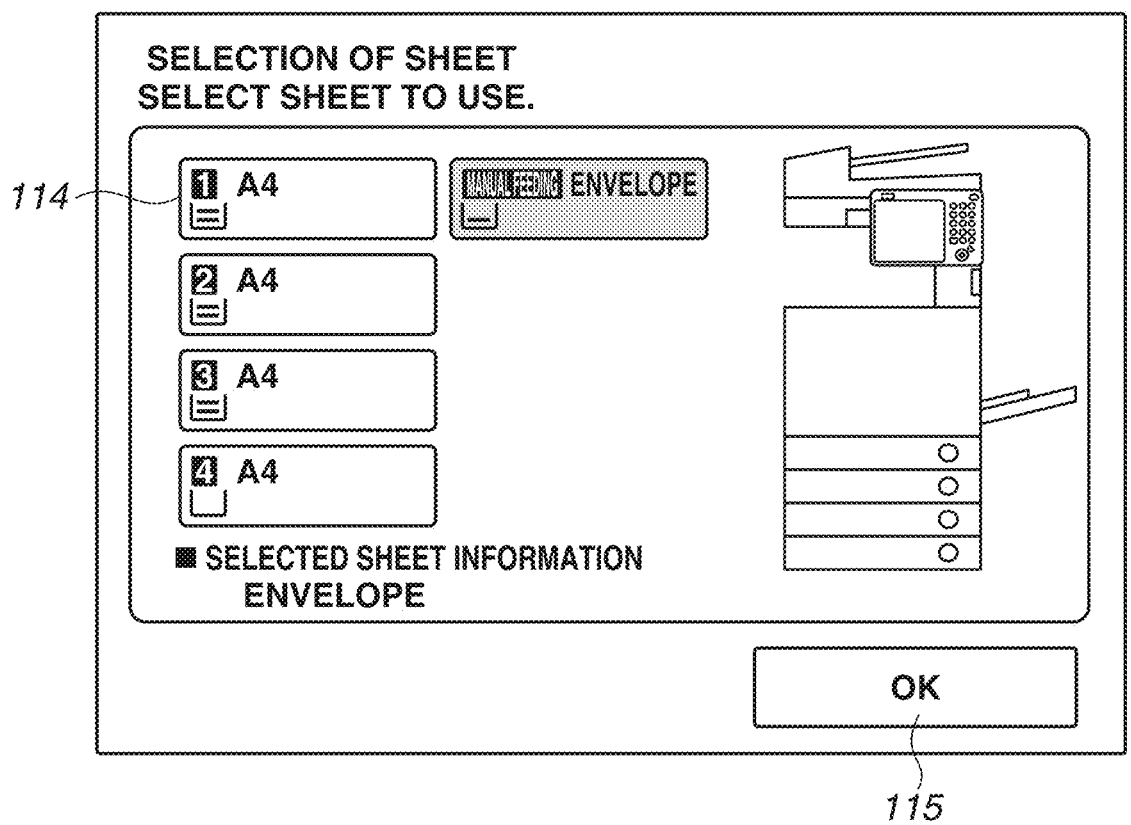
Figure 12A:
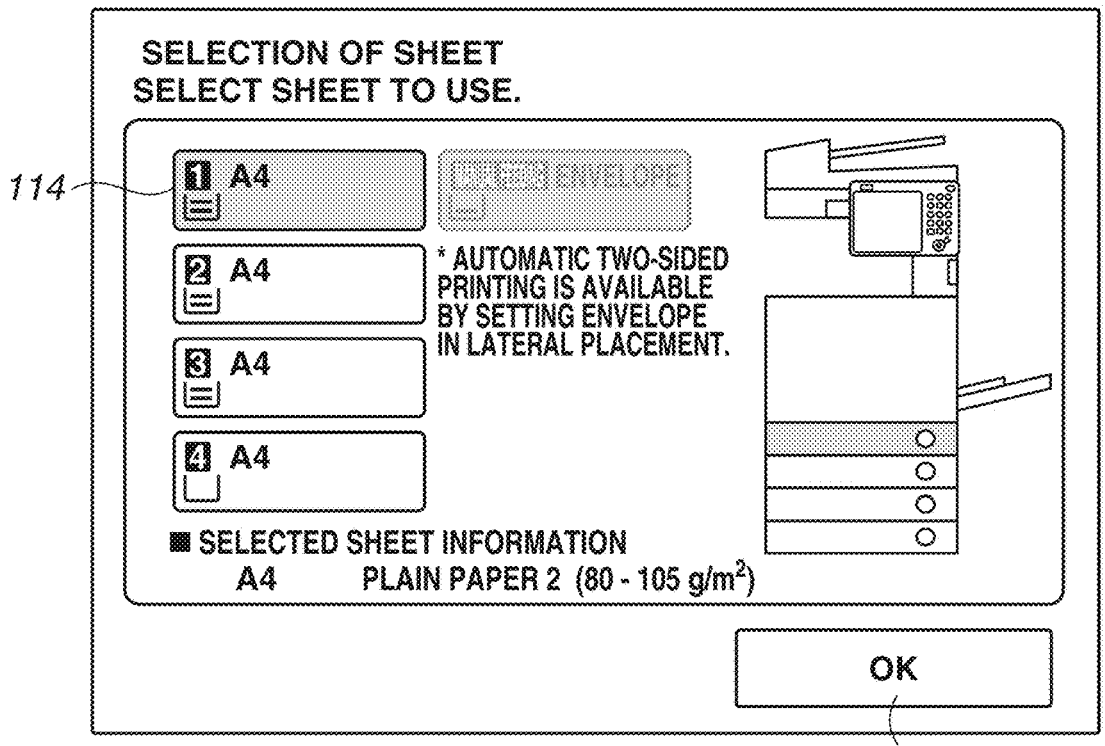
FIGS. 12A and 12B are diagrams each illustrating an example of a display screen in a case where the automatic two-sided printing is selected (a case where the automatic two-sided printing is inhibited).
Figure 12B:
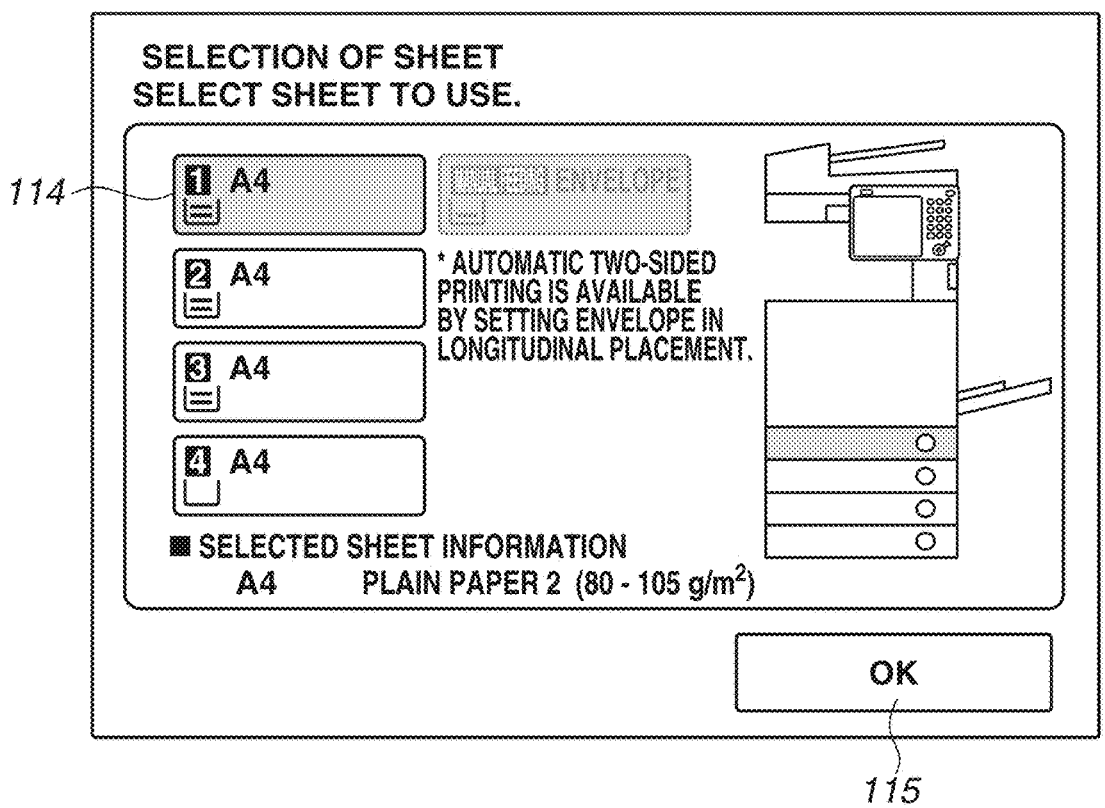

More specifically, there can be a case in which an envelope is set on the manual sheet feeding tray 207 to be conveyed in an orientation in which a bottom fold of the envelope extends in the conveyance direction, and A4 size flat sheets are set in the other sheet feeding stages. In this case, selection of the envelope on the manual sheet feeding tray 207 is enabled in the sheet selection screen in the print setting screen as illustrated in FIG. 11. Meanwhile, an envelope is set on the manual sheet feeding tray 207 to be conveyed in an orientation in which a bottom fold of the envelope extends in the width direction, and A4 size flat sheets are set in the other sheet feeding stages. In this case, selection of the envelope on the manual sheet feeding tray 207 is disabled in the sheet selection screen in the print setting screen as illustrated in FIGS. 12A and 12B. A method for disabling selection may be either of not displaying the option of the envelope and displaying the option of the envelope in a grayout state.

Figure 15:
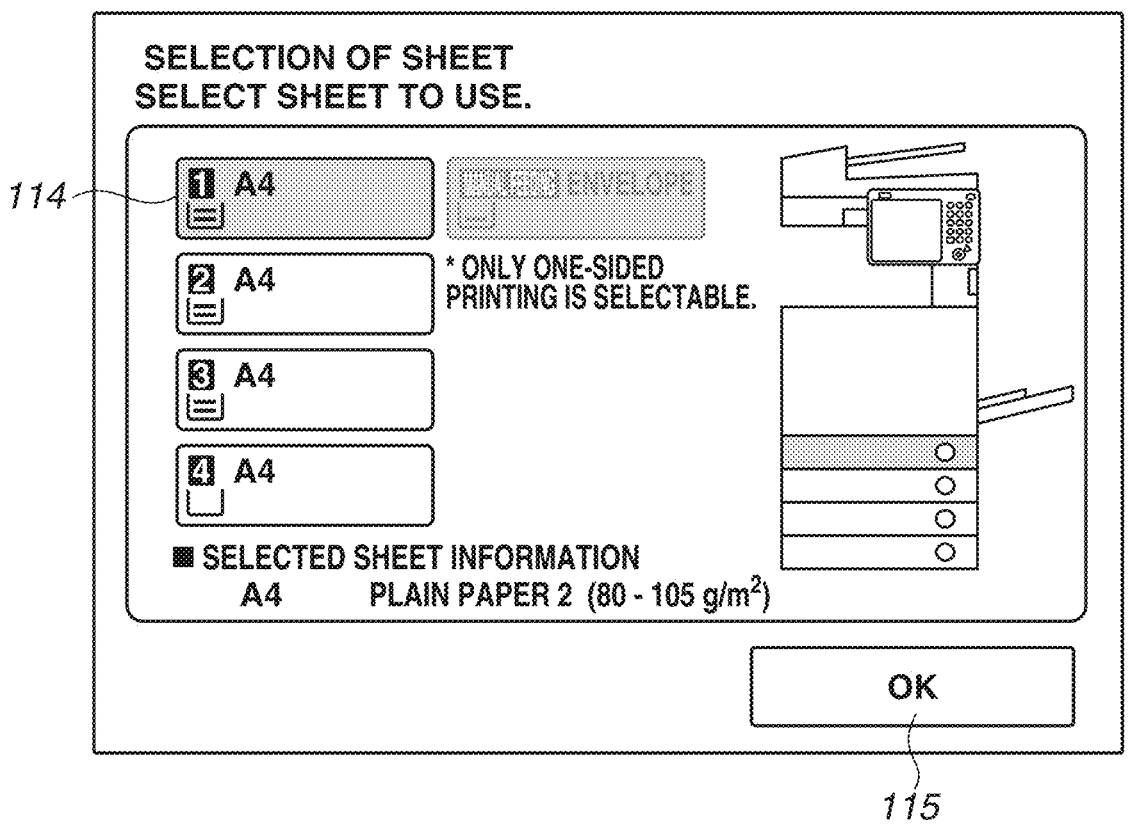
FIG. 15 is a diagram illustrating an example of a display screen in a case where the automatic two-sided printing is selected (a case where the automatic two-sided printing is inhibited).

Further, in a case where the automatic two-sided printing can be performed on an envelope on the manual sheet feeding tray 207 if the setting direction of the envelope is changed, it is more desirable to notify a user of that, as illustrated in FIGS. 12A and 12B. FIG. 12A illustrates an example in which a Western-style Long Y3 envelope is placed in the longitudinal placement on the manual sheet feeding tray, and FIG. 12B illustrates an example in which a Long N3 envelope is placed in the lateral placement on the manual sheet feeding tray. For example, in a case of an envelope which can be set only in an orientation in which a bottom fold of the envelope extends in the width direction as described in the example of a Rectangular K2 envelope, selection of the envelope placed on the manual sheet feeding tray 207 is disabled as illustrated in FIG. 15.

(3) Further, for example, in a case where the two-sided printing is selected, and the manual sheet feeding tray 207 is selected as the sheet feeding stage to be used in the print setting screen (in step S101) in a state in which a sheet is not set on the manual sheet feeding tray 207, processing may be performed as follows. In a case where the two-sided printing is selected, and the manual sheet feeding tray 207 is selected as the sheet feeding stage to be used, the CPU 300 advances the processing to the flowchart in FIG. 7 and causes an operator to register information about a sheet to be set on the manual sheet feeding tray 207. In this regard, a sheet registration screen for the manual sheet feeding tray 207 allows registration of an envelope corresponding to a setting method for conveying the envelope in an orientation in which a bottom fold of the envelope extends in the conveyance direction. In addition, the sheet registration screen disables registration of an envelope corresponding to a setting method for conveying the envelope in an orientation in which a bottom fold of the envelope extends in the width direction. Meanwhile, in a case where the one-sided printing is selected, and the manual sheet feeding tray 207 is selected as the sheet feeding stage to be used in the print setting screen (in step S101), processing is performed as follows. A setting method for conveying an envelope in an orientation in which a bottom fold of the envelope extends in the conveyance direction and a setting method for conveying an envelope in an orientation in which a bottom fold of the envelope extends in the width direction are both allowed.

According to the above-described first to third exemplary embodiments, the CPU 300 obtains position information about a bottom fold based on an input of a setting direction of an envelope by an operator. However, a method for obtaining the position information about the bottom fold is not limited to the above-described one. For example, a detection unit for detecting an orientation of a flap may be installed in the sheet feeding unit.

According to the above descriptions, the configuration including the fixing belt 43 and the pressure roller 41 as the fixing device 40 is described as an example. However, the configuration of the fixing device 40 is not limited to the above-described one as long as the fixing nip portion N is formed.

For example, a fixing roller (a rotation member) and a pressure roller (a rotation member) may form the fixing nip portion N in cooperation with each other. In this case, the motor as the drive source may drive the fixing roller to rotate.

Further, for example, in the fixing nip portion N, at least one of a side (a fixing side) which is in contact with a surface of the recording material P on which an unfixed toner image is carried and a side (a pressing side) which is in contact with a surface opposite to the surface of the recording material P on which the unfixed toner image is carried may be configured as follows. The side may be formed by an endless belt (a rotation member) stretching around a plurality of rollers. For example, the fixing side may be formed by the fixing roller, and the fixing roller and the endless belt may form the fixing nip portion N. Further, for example, the pressing side may be formed by the pressure roller, and the endless belt and the pressure roller may form the fixing nip portion N.

Any of the above-described configurations can provide an effect which is similar to that of the first to the third exemplary embodiments.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-141219, filed Jul. 27, 2018, which is hereby incorporated by reference herein in its entirety.

What is claimed is:

1. An image forming apparatus comprising:
   an image formation unit configured to form an image on a recording material;
   an image heating unit configured to heat the image formed on the recording material by the image formation unit;
   a placement unit on which a recording material to be conveyed to the image formation unit is to be placed; and
   a control unit configured to execute a mode for automatically forming an image on both surfaces of an envelope in such a manner that, after heating an image formed on a first surface of the envelope conveyed from the placement unit to the image formation unit, an image formed on a second surface of the envelope conveyed again to the image formation unit is heated,
   wherein, in a case where an envelope is placed on the placement unit in a first state in which a flap of the envelope is in a direction perpendicular to a conveyance direction of a recording material, the control unit causes execution of two-sided printing on the envelope in the image forming mode and, in a case where an envelope is placed on the placement unit in a second state in which a flap of the envelope is in the conveyance direction of the recording material, the control unit inhibits execution of two-sided printing on the envelope in the image forming mode.

2. The image forming apparatus according to claim 1, further comprising an operation unit configured to input execution of the image forming mode,
   wherein, in a case where an envelope is placed on the placement unit in the second state, the control unit disables selection of the image forming mode from the operation unit.

3. The image forming apparatus according to claim 1, further comprising an input unit configured to be input a state of an envelope placed on the placement unit.

4. The image forming apparatus according to claim 1, wherein the placement unit is a first placement unit, the image forming apparatus further comprising:
   a second placement unit on which a recording material is to be placed; and
   an operation unit configured to be operated by an operator to input an instruction to specify a placement unit to be used for printing from among a plurality of placement units, including the first placement unit and the second placement unit, and to input an execution instruction of the image forming mode,
   wherein, in a case where an instruction to use the first placement unit is input to the operation unit in a state in which an envelope is placed on the first placement unit in the second state, the control unit inhibits an input of execution of the image forming mode to the operation unit.

5. The image forming apparatus according to claim 1, wherein the placement unit is a first placement unit, the image forming apparatus further comprising:
   a second placement unit on which a recording material is to be placed;
   a display unit configured to display information; and
   an operation unit configured to be operated by an operator to input an instruction to specify a placement unit to be used for printing from among a plurality of placement units, including the first placement unit and the second placement unit,
   wherein, in a case where the first placement unit is selected in the operation unit in a state in which an envelope is placed on the first placement unit in the second state, the control unit displays indication that the image forming mode cannot be executed on the display unit.

6. The image forming apparatus according to claim 1, wherein the placement unit is a first placement unit, the image forming apparatus further comprising:
   a second placement unit on which a recording material is to be placed; and
   an operation unit configured to be operated by an operator to input an instruction to specify a placement unit to be used for printing from among a plurality of placement units, including the first placement unit and the second placement unit, and to input an execution instruction of the image forming mode,
   wherein, in a case where an execution instruction of the image forming mode is input to the operation unit in a state in which an envelope is placed on the first placement unit in the second state, the control unit inhibits selection of the first placement unit in the operation unit.

7. The image forming apparatus according to claim 1, wherein the placement unit is a first placement unit, the image forming apparatus further comprising:
   a second placement unit on which a recording material is to be placed;
   a display unit configured to display information; and
   an operation unit configured to be operated by an operator to input an instruction to specify a placement unit to be used for printing from among a plurality of placement units, including the first placement unit and the second placement unit, and to input an execution instruction of the image forming mode,
   wherein, in a case where an execution instruction of the image forming mode is input to the operation unit in a state in which an envelope is placed on the first placement unit in the second state, the control unit displays that the first placement unit cannot be used on the display unit.

8. The image forming apparatus according to claim 1, wherein, in a case where an instruction to execute the image forming mode using an envelope placed on the placement unit is input in a state in which an envelope is placed on the placement unit in the second state, the control unit prompts an operator to change a placement direction of the envelope placed on the placement unit to the first state.

9. The image forming apparatus according to claim 1, wherein the placement unit is a manual sheet feeding tray.

10. An image forming system comprising:
    an image formation unit configured to form an image on a recording material;
    an image heating unit configured to heat the image formed on the recording material by the image formation unit;
    a placement unit on which a recording material to be conveyed to the image formation unit is to be placed; and a control unit configured to execute a mode for automatically forming an image on both surfaces of an envelope in such a manner that, after heating an image formed on a first surface of the envelope conveyed from the placement unit to the image formation unit, an image formed on a second surface of the envelope conveyed again to the image formation unit is heated, wherein, in a case where an input is performed and indicates that an envelope is placed on the placement unit in a first state in which a flap of the envelope is in a direction perpendicular to a conveyance direction of a recording material, the control unit enables an input of execution of two-sided printing on the envelope in the image forming mode and, in a case where an input indicating that an envelope is placed on the placement unit in a second state in which a flap of the envelope is in the conveyance direction of the recording material, the control unit inhibits an input of execution of two-sided printing on the envelope in the image forming mode.

11. The image forming system according to claim 10, further comprising an operation unit configured to receive an input for execution of the image forming mode, wherein, in a case where an envelope is placed on the placement unit in the second state, the control unit does not receive selection of execution of the image forming mode from the operation unit.

12. The image forming system according to claim 11, wherein the placement unit is a first placement unit, the image forming system further comprising a second placement unit on which a recording material is to be placed, wherein, in a case where an instruction to use the first placement unit is input to the operation unit in a state in which an envelope is placed on the first placement unit in the second state, the control unit does not receive an input of execution of the image forming mode.

13. The image forming system according to claim 11, wherein the placement unit is a first placement unit, the image forming system further comprising:

a second placement unit on which a recording material is to be placed; and a display unit configured to display information, wherein, in a case where the first placement unit is selected in the operation unit in a state in which an envelope is placed on the first placement unit in the second state, the control unit displays indication that the image forming mode cannot be executed on the display unit.

14. The image forming system according to claim 11, wherein the placement unit is a first placement unit, the image forming system further comprising a second placement unit on which a recording material is to be placed, wherein, in a case where an execution instruction of the image forming mode is input to the operation unit in a state in which an envelope is placed on the first placement unit in the second state, the control unit does not receive selection of the first placement unit.

15. The image forming system according to claim 11, wherein the placement unit is a first placement unit, the image forming system further comprising:

a second placement unit on which a recording material is to be placed; and a display unit configured to display information, wherein, in a case where an execution instruction of the image forming mode is input from the operation unit in a state in which an envelope is placed on the first placement unit in the second state, the control unit displays that the first placement unit cannot be used on the display unit.

16. The image forming system according to claim 10, further comprising an input unit configured to receive an input for a state of an envelope placed on the placement unit.

17. The image forming system according to claim 10, wherein, in a case where an instruction to execute the image forming mode using an envelope placed on the placement unit is input in a state in which an envelope is placed on the placement unit in the second state, the control unit prompts an operator to change a placement direction of the envelope placed on the placement unit to the first state.

18. The image forming system according to claim 10, wherein the placement unit is a manual sheet feeding tray.

* * * * *